US010703838B2

(12) United States Patent
Holtcamp et al.

(10) Patent No.: US 10,703,838 B2
(45) Date of Patent: Jul. 7, 2020

(54) MIXED CATALYST SYSTEMS WITH FOUR METALLOCENES ON A SINGLE SUPPORT

(71) Applicant: ExxonMobil Chemical Patents Inc., Baytown, TX (US)

(72) Inventors: Matthew W. Holtcamp, Huffman, TX (US); David F. Sanders, Beaumont, TX (US); Matthew S. Bedoya, Humble, TX (US); Ching-Tai Lue, Sugarland, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/137,059

(22) Filed: Sep. 20, 2018

(65) Prior Publication Data

US 2019/0127502 A1 May 2, 2019

Related U.S. Application Data

(60) Provisional application No. 62/579,566, filed on Oct. 31, 2017.

(51) Int. Cl.
| | | |
|---|---|---|
| *C08F 4/6592* | (2006.01) | |
| *C08F 210/16* | (2006.01) | |
| *C08F 210/02* | (2006.01) | |
| *C08J 5/18* | (2006.01) | |
| *C08F 4/659* | (2006.01) | |

(52) U.S. Cl.
CPC .......... *C08F 210/02* (2013.01); *C08F 210/16* (2013.01); *C08J 5/18* (2013.01); *C08F 4/65912* (2013.01); *C08F 4/65916* (2013.01); *C08J 2323/08* (2013.01)

(58) Field of Classification Search
CPC .............. C08F 4/65904; C08F 4/65927; C08F 4/65925; C08F 210/16
See application file for complete search history.

(56) References Cited

U.S. PATENT DOCUMENTS

| | | | |
|---|---|---|---|
| 4,701,432 A | 10/1987 | Welborn, Jr. | |
| 5,032,562 A | 7/1991 | Lo et al. | 502/111 |
| 5,077,255 A | 12/1991 | Welborn, Jr. | |
| 5,135,526 A | 8/1992 | Zinnanti et al. | |
| 5,183,867 A | 2/1993 | Welborn | 526/114 |
| 5,382,630 A | 1/1995 | Stehling et al. | |
| 5,382,631 A | 1/1995 | Stehiing et al. | |
| 5,516,848 A | 5/1996 | Canich et al. | |
| 5,525,678 A | 6/1996 | Mink et al. | 525/246 |
| 5,965,756 A | 10/1999 | McAdon et al. | |
| 6,069,213 A | 5/2000 | Nemzek et al. | |
| 6,175,409 B1 | 1/2001 | Nielsen et al. | |
| 6,207,606 B1 | 3/2001 | Lue et al. | |
| 6,260,407 B1 | 7/2001 | Petro et al. | |
| 6,294,388 B1 | 9/2001 | Petro | |
| 6,310,164 B1 | 10/2001 | Morizono et al. | |
| 6,403,181 B1 | 6/2002 | Barry et al. | 428/36.9 |
| 6,406,632 B1 | 6/2002 | Safir et al. | |
| 6,417,130 B1 | 6/2002 | Mink et al. | 502/113 |
| 6,420,507 B1 | 6/2002 | Kale et al. | |
| 6,436,292 B1 | 8/2002 | Petro | |
| 6,444,764 B1 | 9/2002 | Kristen et al. | |
| 6,451,724 B1 | 9/2002 | Nifant'ev et al. | |
| 6,454,947 B1 | 9/2002 | Safir et al. | |
| 6,461,515 B1 | 10/2002 | Safir et al. | |
| 6,475,391 B2 | 11/2002 | Safir et al. | |
| 6,491,816 B2 | 12/2002 | Petro | |
| 6,491,823 B1 | 12/2002 | Safir et al. | |
| 6,613,713 B2 | 9/2003 | Becke et al. | |
| 6,646,071 B1 | 11/2003 | Klosin et al. | |
| 6,656,866 B2 | 12/2003 | Wenzel et al. | |
| 6,664,348 B2 | 12/2003 | Speca | |
| 6,828,394 B2 | 12/2004 | Vaughan et al. | 526/114 |
| 6,846,770 B2 | 1/2005 | Speca | |
| 6,956,094 B2 | 10/2005 | Mawson et al. | 526/348.2 |
| 6,964,937 B2 | 11/2005 | Mink et al. | 502/113 |
| 6,995,109 B2 | 2/2006 | Mink et al. | 502/103 |
| 7,041,617 B2 | 5/2006 | Jensen et al. | 502/113 |
| 7,115,761 B2 | 10/2006 | Resconi et al. | |
| 7,119,153 B2 | 10/2006 | Jensen et al. | 526/113 |
| 7,129,302 B2 | 10/2006 | Mink et al. | 526/116 |
| 7,141,632 B2 | 11/2006 | Vaughan et al. | |
| 7,172,987 B2 | 2/2007 | Kao et al. | 502/117 |
| 7,179,876 B2 | 2/2007 | Szul et al. | 526/348.2 |
| 7,192,902 B2 | 3/2007 | Brinen et al. | |
| 7,199,072 B2 | 4/2007 | Crowther et al. | 502/113 |
| 7,199,073 B2 | 4/2007 | Martin et al. | 502/113 |
| 7,214,745 B2 | 5/2007 | Arai et al. | |

(Continued)

FOREIGN PATENT DOCUMENTS

| | | | |
|---|---|---|---|
| EP | 0729387 | 5/1995 | .............. C08F 10/00 |
| EP | 0676418 | 7/2000 | ................ C08F 4/00 |

(Continued)

OTHER PUBLICATIONS

Amaya, et al., "Sumanenly Metallocenes: Synthesis and Structure of Mono-and Trinuclear Zirconocene Complexes," Journal of the American Chemical Society, 2014, vol. 136 (36), pp. 12794-12798.
Busico, et al., "Effects of Regiochemical and Sterochemical Errors on the Course of Isotactic Propene Polyinsertion Promoted by Homogenous Ziegler—Natta Catalysts," Macromolecules, 1994, vol. 27, pp. 7538-7543.
Grassi, et al., "Microstructure of Isotactic Polypropylene Prepared with Homogeneous Catalysis: Steroregularity, Regioregularity and 1,3-Insertion," Macromolecules, 1988, vol. 21, pp. 617-622.
Hong, et al., "Immobilized Me2Si(C5Me4)(N-tBu)TiCl2/(nBuCp)2ZrCl2 Hybrid Metallocene Catalyst System for the Production of Poly(ethylene-co-hexene) With Pseudo-Bimodal Molecular Weight and Inverse Comonomer Distribution," Wiley InterScience, Polymer Engineering and Science, 2007, vol. 47, No. 2, pp. 131-139.

(Continued)

*Primary Examiner* — Caixia Lu

(74) *Attorney, Agent, or Firm* — Catherine L. Bell

(57) ABSTRACT

The present disclosure provides a supported catalyst system and process for use thereof. In particular, the catalyst system includes four different catalysts, a support material and an activator. The catalyst system may be used for preparing polyolefins, such as polyethylene.

59 Claims, 4 Drawing Sheets

(56) References Cited

U.S. PATENT DOCUMENTS

| | | | |
|---|---|---|---|
| 7,226,886 B2 | 6/2007 | Jayaratne et al. | 502/129 |
| 7,285,608 B2 | 10/2007 | Schottek et al. | 526/160 |
| 7,312,283 B2 | 12/2007 | Martin et al. | 526/116 |
| 7,355,058 B2 | 4/2008 | Luo et al. | |
| 7,381,679 B2 | 6/2008 | Rieger et al. | |
| 7,385,015 B2 | 6/2008 | Holtcamp | |
| 7,396,888 B2 | 7/2008 | Razavi | 526/114 |
| 7,595,364 B2 | 9/2009 | Shannon et al. | 525/191 |
| 7,619,047 B2 | 11/2009 | Yang et al. | 526/116 |
| 7,662,894 B2 | 2/2010 | Hamed et al. | 526/113 |
| 7,829,495 B2 | 11/2010 | Floyd et al. | 502/152 |
| 7,855,253 B2 | 12/2010 | Shannon et al. | 525/191 |
| 8,088,867 B2 | 1/2012 | Jiang et al. | |
| 8,110,518 B2 | 2/2012 | Marin et al. | |
| 8,138,113 B2 | 3/2012 | Yang et al. | 502/113 |
| 8,268,944 B2 | 9/2012 | Yang et al. | 526/114 |
| 8,288,487 B2 | 10/2012 | Yang et al. | 526/113 |
| 8,329,834 B2 | 12/2012 | Masino et al. | 526/114 |
| 8,378,029 B2 | 2/2013 | Liu et al. | 525/191 |
| 8,501,891 B2 | 8/2013 | Nozue et al. | |
| 8,575,284 B2 | 11/2013 | Luo et al. | |
| 8,598,061 B2 | 12/2013 | Yang et al. | |
| 8,680,218 B1 | 3/2014 | Yang et al. | 526/86 |
| 8,785,551 B2 | 7/2014 | Arriola et al. | 524/783 |
| 8,815,357 B1 | 8/2014 | Inn et al. | |
| 8,871,885 B2 | 10/2014 | Nozue et al. | |
| 8,940,842 B2 | 1/2015 | Yang et al. | 526/61 |
| 8,957,168 B1 | 2/2015 | Yang et al. | 526/142 |
| 9,079,993 B1 | 7/2015 | St. Jean et al. | C08F 210/16 |
| 9,163,098 B2 | 10/2015 | McDaniel et al. | C08F 4/65925 |
| 9,181,370 B2 | 11/2015 | Sukhadia et al. | C08F 210/16 |
| 9,193,856 B2 | 11/2015 | Ebata et al. | |
| 9,303,099 B2 | 4/2016 | Yang et al. | C08F 4/76 |
| 9,796,795 B2 | 10/2017 | Canich et al. | |
| 9,803,037 B1 | 10/2017 | Canich et al. | |
| 10,294,312 B2 | 5/2019 | Holtcamp et al. | |
| 10,533,063 B2 | 1/2020 | Ye et al. | 526/129 |
| 2002/0007023 A1 | 1/2002 | McDaniel et al. | |
| 2004/0214953 A1 | 10/2004 | Yamada et al. | |
| 2004/0259722 A1 | 12/2004 | Wang | 502/103 |
| 2005/0288461 A1 | 12/2005 | Jensen et al. | |
| 2006/0275571 A1 | 12/2006 | Mure et al. | 428/36.9 |
| 2007/0043176 A1 | 2/2007 | Martin et al. | 526/64 |
| 2008/0287620 A1 | 11/2008 | Ravishankar | |
| 2010/0331505 A1 | 12/2010 | Masino et al. | 526/170 |
| 2012/0130032 A1 | 5/2012 | Hussein et al. | |
| 2014/0031504 A1 | 1/2014 | Jacobsen | |
| 2014/0127427 A1 | 5/2014 | Vantomme et al. | 428/17 |
| 2014/0213734 A1 | 7/2014 | Jiang | |
| 2015/0299352 A1 | 10/2015 | Sohn | C08F 210/16 |
| 2015/0322184 A1 | 11/2015 | Hlavinka et al. | |
| 2016/0032027 A1 | 2/2016 | St. Jean et al. | C08F 10/14 |
| 2016/0075803 A1 | 3/2016 | St. Jean et al. | C08F 210/16 |
| 2016/0244535 A1 | 8/2016 | Canich et al. | |
| 2016/0347874 A1 | 12/2016 | Boller et al. | C08F 4/76 |
| 2017/0362350 A1 | 12/2017 | Canich et al. | |
| 2018/0155474 A1 | 6/2018 | Holtcamp et al. | |
| 2018/0171040 A1 | 6/2018 | Ye et al. | |

FOREIGN PATENT DOCUMENTS

| | | | |
|---|---|---|---|
| EP | 1120424 | 8/2001 | |
| EP | 0705851 | 1/2004 | C08F 10/00 |
| EP | 2003166 | 12/2008 | C08L 23/08 |
| EP | 2374822 | 6/2010 | C08F 210/16 |
| JP | 5262405 | 8/2013 | |
| KR | 101132180 | 4/2012 | C08F 10/00 |
| KR | 2015/0058020 | 5/2015 | C08F 10/00 |
| KR | 20150066484 | 6/2015 | |
| WO | 98/06727 | 2/1998 | |
| WO | 98/27103 | 6/1998 | |
| WO | 00/12565 | 3/2000 | |
| WO | 2000/012565 | 3/2000 | C08F 4/02 |
| WO | 2001/009200 | 2/2001 | C08F 10/00 |
| WO | 01/42315 | 6/2001 | |
| WO | 02/060957 | 8/2002 | |
| WO | 03/025027 | 3/2003 | |
| WO | 2004/013149 | 2/2004 | |
| WO | 2004/046214 | 6/2004 | |
| WO | 2006/080817 | 8/2006 | C08F 4/64 |
| WO | 2007/067259 | 6/2007 | F16L 9/12 |
| WO | 2007/080365 | 7/2007 | C08F 4/659 |
| WO | 2009/146167 | 12/2009 | B01J 27/12 |
| WO | 2011/012245 | 2/2011 | |
| WO | 2012/006272 | 1/2012 | C08F 4/76 |
| WO | 2012/158260 | 11/2012 | C08F 10/00 |
| WO | 2015/009474 | 1/2015 | |
| WO | 2015/123168 | 8/2015 | C08F 210/16 |
| WO | 2016/114914 | 7/2016 | |
| WO | 2016/114915 | 7/2016 | |
| WO | 2016/114916 | 7/2016 | |
| WO | 2016/171807 | 10/2016 | |
| WO | 2016/171808 | 10/2016 | |
| WO | 2016/172099 | 10/2016 | |
| WO | 2017/034680 | 3/2017 | |
| WO | 2017/192225 | 11/2017 | |
| WO | 2017/192226 | 11/2017 | |
| WO | 2017/204830 | 11/2017 | |
| WO | 2018/067259 | 4/2018 | |

OTHER PUBLICATIONS

Iedema, et al., "Predicting the Molecular Weight Distribution of Polyethylene for Mixed Systems with a Constrained-Geometry Metallocene Catalyst in a Semibatch Reactor," Industrial & Engineering Chemistry Research, 2004, vol. 43, pp. 36-50.

Kim, et al., "Copolymerization of Ethylene and α-Olefins with Combined Metallocene Catalysts, III. Production of Polyolefins with Controlled Microstructres," Journal of Polymer Science; Part A: Polymer Chemistry, 2000, vol. 38, pp. 1427-1432.

Kociolek, et al., "Intramolecular Thermal Cyclotrimerization of an Acyclic Triyne: An Uncatalyzed Process," Tetrahedron Letters, 1999, vol. 40, pp. 4141-4144.

Mironov, et al., "Effect of Chlorosilyl Groups on the Liability of Chlorine in (2-Chloroalkyl) Silanes in the Reaction of Dehydrochlorination with Quinoline," N. D. Zelinskii Institute of Organic Chemistry Academy of Sciences USSR, 1957, pp. 1188-1194.

Calhoun et al., Polymer Chemistry, Chapter 5, pp. 77-87.

Chen, Keran et al. (2014) "Modeling and Simulation of Borstar Bimodal Polyethylene Process Based on a Rigorous PC-SAFT Equation of State Model," *Ind. Eng. Chem. Res.*, v.53(51), pp. 19905-19915.

Leino, R. et al. (2001) "Syndiospecific Propylene Polymerization with $C_1$ Symmetric Group 4 ansa-Metallocene Catalysts" *Macromolecules*, v. 34, pp. 2072-2082.

Sheu, S. (2006) "Enhanced Bimodal PE Makes the Impossible Possible," (https://www.tappi.org/content/06asiaplace/pdfs-english/enhanced.pdf, 30 pgs.

Stadelhofer, J. et al. (1975) *J. Organometallic Chemistry*, v.84, pp. C1-C4.

International Search Report (9 pages) and Written Opinion (10 pages) for international application No. PCT/US2018/052007, dated Feb. 27, 2019.

MIXED CATALYST SYSTEMS WITH FOUR METALLOCENES ON A SINGLE SUPPORT

PRIORITY CLAIM

This application claims priority to and the benefit of U.S. Ser. No. 62/579,566, filed Oct. 31, 2017 and is incorporated by reference in its entirety.

FIELD OF THE INVENTION

The present disclosure provides a multi-catalyst system and process for use thereof. In particular, the catalyst system comprises four group 4 metallocene compounds, a support material, and an activator. The catalyst system may be used for olefin polymerization processes.

BACKGROUND OF THE INVENTION

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers.

Low density polyethylene is generally prepared at high pressure using free radical initiators or in gas phase processes using Ziegler-Natta or vanadium catalysts. Low density polyethylene typically has a density at about 0.916 g/cm$^3$. Typical low density polyethylene produced using free radical initiators is known in the industry as "LDPE." LDPE is also known as "branched" or "heterogeneously branched" polyethylene because of the relatively large number of long chain branches extending from the main polymer backbone. Polyethylene with a similar density that does not contain branching is known as "linear low density polyethylene" ("LLDPE") and is typically produced with conventional Ziegler-Natta catalysts or with metallocene catalysts. "Linear" means that the polyethylene has few, if any, long chain branches and typically has a g'vis value of 0.97 or above, such as 0.98 or above. Polyethylenes having still greater density are the high density polyethylenes ("HDPEs"), e.g., polyethylenes having densities greater than 0.940 g/cm$^3$ and are generally prepared with Ziegler-Natta or chrome catalysts. Very low density polyethylenes ("VLDPEs") can be produced by a number of different processes yielding polyethylenes typically having a density 0.890 to 0.915 g/cm$^3$.

Copolymers of polyolefins, such as polyethylene, have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. Polymerization may take place in the presence of catalyst systems such as those employing a Ziegler-Natta catalyst, a chromium based catalyst, or a metallocene catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1000 carbons is similar among the copolymer molecules of different chain lengths, the composition distribution is said to be "narrow".

The composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

A composition distribution of a copolymer composition is influenced by the identity of the catalyst(s) used to form the polyolefins of the composition. Ziegler-Natta catalysts and chromium based catalysts tend to produce compositions with broad composition distributions, whereas metallocene catalysts typically produce compositions with narrow composition distributions.

Furthermore, polyolefins, such as polyethylenes, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition.

For example, useful bimodal polyolefin compositions include a first polyolefin having low molecular weight and high comonomer content (i.e., comonomer incorporated into the polyolefin backbone) while a second polyolefin has a high molecular weight and low comonomer content. As used herein, "low comonomer content" is defined as a polyolefin having 6 wt % or less of comonomer based upon the total weight of the polyolefin. The high molecular weight fraction produced by the second catalyst may have a high comonomer content. As used herein, "high comonomer content" is defined as a polyolefin having greater than 6 wt % of comonomer based upon the total weight of the polyolefin.

There are several methods for producing bimodal or broad molecular weight distribution polyolefins, e.g., melt blending, polymerizing in reactors in series or parallel configuration, or polymerizing in a single reactor with bimetallic catalysts. However, these methods, such as melt blending, are difficult to completely homogenize the polyolefin compositions and have high cost.

Furthermore, synthesizing these bimodal polyolefin compositions using a mixed catalyst system would involve a first catalyst to catalyze the polymerization of, for example, ethylene under substantially similar conditions as that of a second catalyst while not interfering with the catalysis of polymerization of the second catalyst.

There exists a need for catalyst systems that provide polyolefin compositions having novel combinations of comonomer content fractions and molecular weights. There is further a need for novel multi-catalyst systems where one catalyst does not inhibit the polymerization catalysis of any of the other catalysts or vice versa.

Catalysts for olefin polymerization are often based on cyclopentadienyl transition metal catalyst compounds as catalyst precursors combined with activators, typically an alumoxane or with an activator containing a non-coordinating anion. A typical metallocene catalyst system includes metallocene catalyst, activator, and optional support. Supported catalyst systems are used in many polymerization processes, often in slurry or gas phase polymerization processes.

For example U.S. Pat. No. 7,829,495 discloses Me$_2$Si (fluorenyl)(3-nPr-Cp)ZrCl$_2$ and U.S. Pat. No. 7,179,876 discloses supported (nPrCp)$_2$HfMe$_2$.

Further, Stadelhofer, J.; Weidlein, J.; Haaland, A. *J. Organomet. Chem.* 1975, 84, C1-C4 discloses preparation of potassium cyclopentadienide.

Additionally, $Me_2C(Cp)(Me_3SiCH_2\text{-Ind})MCl_2$ and $Me_2C(Cp)(Me, Me_3SiCH_2\text{-Ind})MCl_2$, where M is Zr or Hf have been synthesized and screened for the syndiospecific polymerization of propylene; see Leino, R., Gomez, F.; Cole, A.; Waymouth, R. *Macromolecules* 2001, 34, 2072-2082.

Metallocenes are often combined with other catalysts, or even other metallocenes, to attempt to modify polymer properties. See, for example, U.S. Pat. Nos. 8,088,867 and 5,516,848 (which discloses the use of two different cyclopentadienyl based transition metal catalyst compounds activated with alumoxane or non-coordinating anions). See also PCT/US2016/021748, filed Mar. 10, 2016, which discloses two metallocenes used to make ethylene copolymers.

Likewise, $Me_2C(Cp)(Me_3SiCH_2\text{-Ind})MCl_2$ and $Me_2C(Cp)(Me, Me_3SiCH_2\text{-Ind})MCl_2$, where M is Zr or Hf have been synthesized and screened for the syndiospecific polymerization of propylene; see Leino, R., Gomez, F.; Cole, A.; Waymouth, R. *Macromolecules* 2001, 34, 2072-2082.

Additional references of interest include: Hong et al. in Immobilized $Me_2Si(C5Me_4)(N\text{-t-Bu})TiCl_2/(nBuCp)_2ZrCl_2$ Hybrid Metallocene Catalyst System for the Production of Poly(ethylene-co-hexene) with Pseudo-bimodal Molecular Weight and Inverse Comonomer Distribution, (Polymer Engineering and Science-2007, DOI 10.1002/pen, pages 131-139, published online in Wiley InterScience (www.interscience.wiley.com) 2007 Society of Plastics Engineers); Kim, J. D. et al., J. Polym. Sci. Part A: Polym Chem., 38, 1427 (2000); Iedema, P. D. et al., Ind. Eng. Chem. Res., 43, 36 (2004); U.S. Pat. Nos. 4,701,432; 5,032,562; 5,077,255; 5,135,526; 5,183,867; 5,382,630; 5,382,631; 5,525,678; 6,069,213; 6,207,606; 6,656,866; 6,828,394; 6,964,937; 6,956,094; 6,964,937; 6,995,109; 7,041,617; 7,119,153; 7,129,302; 7,141,632; 7,172,987; 7,179,876; 7,192,902; 7,199,072; 7,199,073; 7,226,886; 7,285,608; 7,312,283; 7,355,058; 7,385,015; 7,396,888; 7,595,364; 7,619,047; 7,662,894; 7,829,495; 7,855,253; 8,110,518; 8,138,113; 8,268,944; 8,288,487; 8,329,834; 8,378,029; 8,575,284; 8,598,061; 8,680,218; 8,785,551; 8,815,357; 8,940,842; 8,957,168; 9,079,993; 9,163,098; 9,181,370; 9,303,099; U.S. Publication Nos. 2004/259722; 2006/275571; 2007/043176; 2010/331505; 2012/0130032; 2014/0031504; 2014/0127427; 2015/299352; 2016/0032027; 2016/075803; PCT Publication Nos. WO 97/35891; WO 98/49209; WO 00/12565; WO 2001/09200; WO 02/060957; WO 2004/046214; WO 2006/080817; WO 2007/067259; WO 2007/080365; WO 2009/146167; WO 2012/006272; WO 2012/158260; WO 2014/0242314; WO 2015/123168; WO 2016/172099; PCT Application No. PCT/US2016/021757, filed Mar. 10, 2016; EP 2 374 822; EP 2 003 166; EP 0,729,387; EP 0,676,418; EP 0 705 851; KR 20150058020; KR 101132180; Sheu, S., 2006, "Enhanced bimodal PE makes the impossible possible", http://www.tappi.org/content/06asiaplace/pdfs-english/enhanced.pdf; and Chen et al., "Modeling and Simulation of Borstar Bimodal Polyethylene Process Based on Rigorous PC-SAFT Equation of State Model", Industrial & Engineering Chemical Research, 53, pp. 19905-19915, (2014). Other references of interest include: U.S. Publication No. 2015/0322184 and A. Calhoun, et al. "Polymer Chemistry", Chapter 5, pages 77-87.

There is still a need in the art for new and improved catalyst systems for the polymerization of olefins, in order to achieve increased activity or enhanced polymer properties, to increase conversion or comonomer incorporation, or to alter comonomer distribution. There is also a need for supported catalyst systems and processes for the polymerization of olefins (such as ethylene) using such catalyst systems to provide ethylene polymers having the unique properties of high stiffness, high toughness and good process ability.

SUMMARY OF THE INVENTION

The present disclosure provides a supported catalyst system including four group 4 metallocene compounds; a support material; and an activator wherein the catalyst system comprises:

a) at least two different catalysts represented by formula (A):

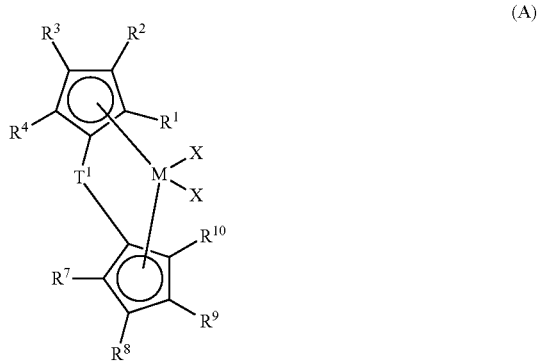

(A)

wherein:

M is Hf or Zr;

each $R^1$, $R^2$, and $R^4$ is independently hydrogen, alkoxide or a $C_1$ to $C_{40}$ substituted or unsubstituted hydrocarbyl group; $R^3$ is independently hydrogen, alkoxide or a $C_1$ to $C_{40}$ substituted or unsubstituted hydrocarbyl group or is $CH_2$—$SiR'_3$ or $CH_2$—$CR'_3$, and each R is independently a $C_1$ to $C_{20}$ substituted or unsubstituted hydrocarbyl;

each $R^7$, $R^8$, $R^9$ and $R^{10}$ is independently hydrogen, alkoxide, a $C_1$ to $C_{40}$ substituted or unsubstituted hydrocarbyl group, $CH_2$—$SiR'_3$, or $CH_2$—$CR'_3$, where each R is independently a $C_1$ to $C_{20}$ substituted or unsubstituted hydrocarbyl, provided that at least one of $R^7$, $R^8$, $R^9$ and $R^{10}$ is $CH_2$—$SiR'_3$ or $CH_2$—$CR'_3$, preferably $R^8$ and/or $R^9$ is $CH_2$—$SiR'_3$ or $CH_2$—$CR'_3$, preferably $R^9$ is $CH_2$—$SiR'_3$ or $CH_2$—$CR'_3$;

$T^1$ is a bridging group; and each X is independently a univalent anionic ligand, or two Xs are joined and bound to the metal atom to form a metallocyclic ring, or two Xs are joined to form a chelating ligand, a diene ligand, or an alkylidene ligand;

b) at least two different catalysts represented by formula (B):

(B)

wherein:

each Cp is independently a cyclopentadienyl, indenyl or fluorenyl group which may be independently substituted or unsubstituted;

$M^1$ is zirconium or hafnium;

$T^2$ is a bridging group;

y is 0 or 1, indicating the absence or presence of $T^2$;

X is a halide, a hydride, an alkyl group, an alkenyl group or an arylalkyl group;

m=2 or 3, q=0, 1, 2, or 3, and the sum of m+q is equal to the oxidation state of the transition metal, typically 2, 3 or 4; and each Cp and X is bound to $M^1$;

c) a support material; and d) an activator.

The present disclosure also provides a process for polymerization of monomers (such as olefin monomers) including contacting one or more monomers with the above supported catalyst systems.

The present disclosure also provides a process to produce ethylene polymer compositions including: i) contacting in a single reaction zone, in the gas phase or slurry phase, ethylene and $C_3$ to $C_{20}$ comonomer with a catalyst system including a support, an activator, and the catalyst system described above, and ii) obtaining an in-situ ethylene polymer composition having at least 50 mol % ethylene and a density of 0.890 g/cc or more, alternatively 0.910 g/cc or more, alternatively 0.935 g/cc or more.

The present disclosure also provides a process to produce ethylene polymer compositions including: i) contacting in a single reaction zone, in the gas phase or slurry phase, ethylene and $C_3$ to $C_{20}$ comonomer with a catalyst system including a support, an activator, and the catalyst system described above, and obtaining an ethylene polymer having: a) density of 0.890 g/cc or more, b) a melt flow index (ASTM 1238, 190° C., 2.16 kg) of 0.1 to 80 dg/min, c) Mw/Mn of 2.5 to 12.5.

The present disclosure also provides polymer compositions produced by the methods and catalyst systems described herein.

DETAILED DESCRIPTION

Figure 1:
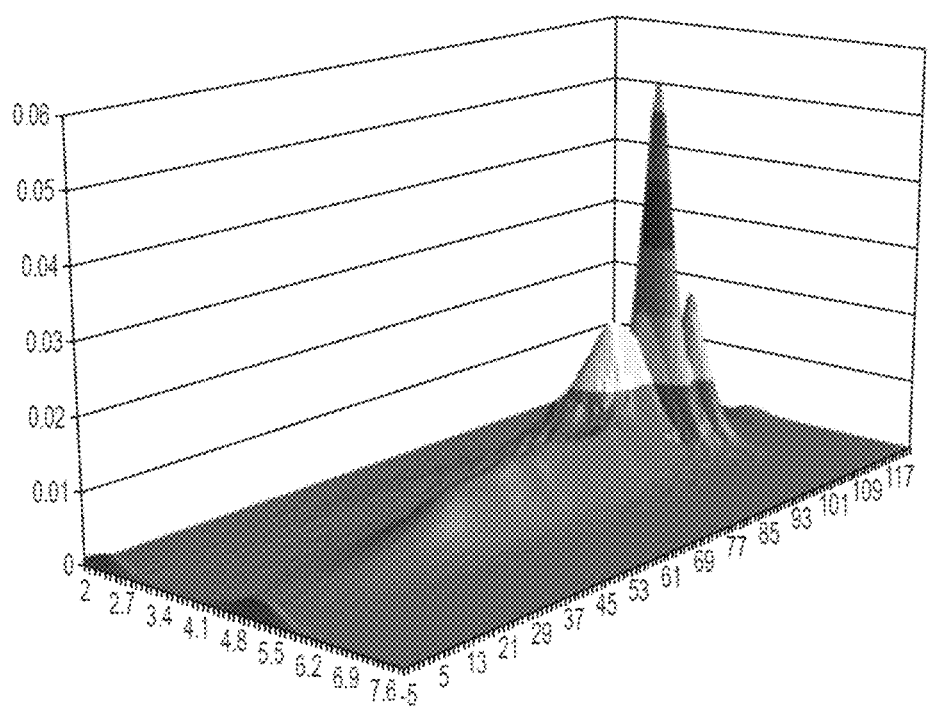
FIG. 1 is a 4D-gel permeation chromatogram/spectrum of a polyethylene resin, according to at least one embodiment.

The present disclosure provides a multi-catalyst system and process for use thereof. In particular, the catalyst system comprises four different group 4 metallocene compounds, a support material, and an activator. The catalyst system may be used for olefin polymerization processes. Catalyst systems of the present disclosure can provide increased activity or enhanced polymer properties, to increase conversion or comonomer incorporation, or to alter comonomer distribution. Catalyst systems and processes of the present disclosure can provide ethylene polymers having the unique properties of high stiffness, high toughness and good process ability.

For purposes of the present disclosure, a "catalyst system" is a combination of at least four catalyst compounds, an activator, and a support material. The catalyst system may further comprise one or more additional catalyst compounds. The terms "mixed catalyst system", "mixed catalyst", and "supported catalyst system" may be used interchangeably herein with "catalyst system." For purposes of the present disclosure, when catalyst systems are described as including neutral stable forms of the components, it is well understood by one of ordinary skill in the art, that the ionic form of the component is the form that reacts with the monomers to produce polymers.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor," "pre-catalyst," "catalyst," "catalyst compound," "metal compound," "metal catalyst compound", "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise the terms "group," "radical," and "substituent" are also used interchangeably in this document. For purposes of the present disclosure, "hydrocarbyl radical" is defined to be $C_1$-$C_{100}$ radicals, that may be linear, branched, or cyclic, and when cyclic, aromatic or non-aromatic.

For purposes of the present disclosure, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as $C_1$, Br, F, I, $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like (where R* is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably, N, O, or S.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" is used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

For purposes of the present disclosure, an ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene; and an ethylene polymer having a density of more than 0.940 g/cm$^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

Polyethylene in an overlapping density range, i.e., 0.890 to 0.930 g/cm$^3$, typically from 0.915 to 0.930 g/cm$^3$, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index (g'$_{vis}$) of 0.97 or above, preferably 0.98 or above. Branching index, g'$_{vis}$, is measured by GPC-4D as described below.

For purposes of the present disclosure, ethylene shall be considered an α-olefin.

As used herein, M$_n$ is number average molecular weight, M$_w$ is weight average molecular weight, and M$_z$ is z average molecular weight, wt % is weight percent, and mol % is mole percent. Unless otherwise noted, all molecular weights (e.g., Mw, Mn, Mz) are reported in units of g/mol. Molecular weight distribution (MWD), also referred to as polydispersity index (PDI), is defined as the Mw divided by Mn. The following abbreviations may be used herein: Me is methyl, Et is ethyl, t-Bu and tBu are tertiary butyl, iPr and $^i$Pr are isopropyl, Cy is cyclohexyl, THF (also referred to as the is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

As used herein, the term "metallocene compound" includes compounds having two or three Cp ligands (cyclopentadienyl and ligands isolobal to cyclopentadienyl) bound to at least one Zr or Hf metal atom, and one or more leaving group(s) bound to the at least one metal atom.

For purposes of the present disclosure, in relation to all metallocene catalyst compounds, the term "substituted" means that a hydrogen group has been replaced with a hydrocarbyl group, a heteroatom, or a heteroatom containing group. For example, methyl cyclopentadiene (Cp) is a Cp substituted with a methyl group.

For purposes of the present disclosure, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may include at least one aromatic group.

The present disclosure provides a supported catalyst system including: (i) two different bridged metallocene compounds which are both good comonomer incorporators; (ii) two other metallocene compounds both of which are poor comonomer incorporators; (iii) a support material; and (iv) an activator; wherein the two bridged metallocene compounds which are both good comonomer incorporators are different and both are represented by formula (A):

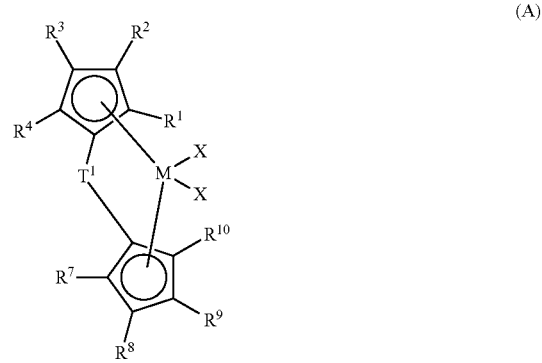

wherein:
M is Hf or Zr;
each $R^1$, $R^2$, and $R^4$ is independently hydrogen, alkoxide or a $C_1$ to $C_{40}$ substituted or unsubstituted hydrocarbyl group; $R^3$ is independently hydrogen, alkoxide or a $C_1$ to $C_{40}$ substituted or unsubstituted hydrocarbyl group or is $CH_2$—$SiR'_3$ or $CH_2$—$CR'_3$, and each R is independently a $C_1$ to $C_{20}$ substituted or unsubstituted hydrocarbyl;
each $R^7$, $R^8$, and $R^{19}$ is independently hydrogen, alkoxide or a $C_1$ to $C_{40}$ substituted or unsubstituted hydrocarbyl group; $R^9$ is $CH_2$—$SiR'_3$ or $CH_2$—$CR'_3$, and each R' is independently a $C_1$ to $C_{20}$ substituted or unsubstituted hydrocarbyl;
$T^1$ is a bridging group; and
each X is independently a univalent anionic ligand, or two Xs are joined and bound to the metal atom to form a metallocyclic ring, or two Xs are joined to form a chelating ligand, a diene ligand, or an alkylidene ligand; and
the at least two different catalysts which are both poor comonomer incorporators are represented by formula (B):

wherein:
each Cp is independently a cyclopentadienyl, indenyl or fluorenyl group which may be independently substituted or unsubstituted;
$M^1$ is zirconium or hafnium;
$T^2$ is a bridging group;
y is 0 or 1, indicating the absence or presence of T;
X is a halide, a hydride, an alkyl group, an alkenyl group or an arylalkyl group;
m=2 or 3, q=0, 1, 2, or 3, and the sum of m+q is equal to 2, 3, or 4; and
each Cp and X is bound to $M^1$.

In an embodiment, the supported catalyst system of the present disclosure comprises
a) at least two different catalysts represented by formula (A):

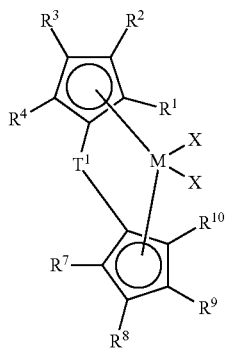

(A)

wherein:
M is Hf or Zr;
each $R^1$, $R^2$, and $R^4$ is independently hydrogen, alkoxide or a $C_1$ to $C_{40}$ substituted or unsubstituted hydrocarbyl group;
$R^3$ is independently hydrogen, alkoxide or a $C_1$ to $C_{40}$ substituted or unsubstituted hydrocarbyl group or is $CH_2$—$SiR'_3$ or $CH_2$—$CR'_3$, and each R is independently a $C_1$ to $C_{20}$ substituted or unsubstituted hydrocarbyl;
each $R^7$, $R^8$, $R^9$ and $R^{10}$ is independently hydrogen, alkoxide, a $C_1$ to $C_{40}$ substituted or unsubstituted hydrocarbyl group, $CH_2$—$SiR'_3$, or $CH_2$—$CR'_3$, where each R is independently a $C_1$ to $C_{20}$ substituted or unsubstituted hydrocarbyl, provided that at least one of $R^7$, $R^8$, $R^9$ and $R^{10}$ is $CH_2$—$SiR'_3$ or $CH_2$—$CR'_3$, preferably $R^8$ and/or $R^9$ is $CH_2$—$SiR'_3$ or $CH_2$—$CR'_3$, preferably $R^9$ is $CH_2$—$SiR'_3$ or $CH_2$—$CR'_3$;
$T^1$ is a bridging group; and
each X is independently a univalent anionic ligand, or two Xs are joined and bound to the metal atom to form a metallocyclic ring, or two Xs are joined to form a chelating ligand, a diene ligand, or an alkylidene ligand;
b) at least one catalyst represented by formula (C) and at least one catalyst represented by formula (D):

(C)

(D)

wherein:
each Cp is independently a cyclopentadienyl, indenyl or fluorenyl group which may be independently substituted or unsubstituted;
$M^1$ is zirconium or hafnium;
$M^2$ is zirconium or hafnium;
$T^3$ is a bridging group;
X is a halide, a hydride, an alkyl group, an alkenyl group or an arylalkyl group;
m=2 or 3, q=0, 1, 2, or 3, and the sum of m+q is 2, 3, or 4; and
each Cp and X is bound to M' or $M^2$;
c) a support material; and
d) an activator.

The four catalyst compounds can have different hydrogen responses (each having a different reactivity toward hydrogen) during the polymerization process. Hydrogen is often used in olefin polymerization to control the final properties of the polyolefin. The first catalyst can show a more negative response to changes of hydrogen concentration in reactor than the second catalyst. If the catalysts have different hydrogen responses in the supported catalyst systems, the properties of resulting polymer can be influenced. Changes of hydrogen concentration in the reactor may affect molecular weight, molecular weight distributions, and other properties of the resulting polyolefin when using a combination of such two catalyst compounds. Thus, the present disclosure further provides a multi-modal polyolefin obtained from polymerizations using the above supported catalyst systems.

In at least one embodiment, catalysts represented by formula (A) are good comonomer (such as hexene) incorporators (e.g., provides comonomer content of 6% or greater) and yields polyethylene with higher molecular weight than catalysts represented by formulas (B), (C) and (D) which under similar conditions yields lower molecular weight than catalysts represented by formula (A). Catalysts represented by formula (B), (C) and (D) can also incorporate less comonomer (such as hexene) under similar reaction conditions. When two catalysts represented by formula (A) and the at least two catalysts represented by formula catalyst (B) are combined on one support, an in-reactor blend of polyethylene is produced with a mix of low and high density resins in which the higher density resin (or higher melting) is combined with lower density higher molecular weight resin. Catalysts represented by formulas (A), (B), (C), and (D) may, independently, be a single isomer or a combination of isomers, e.g., 2, 3, 4, 5, or 6 isomers, typically 2 isomers.

The four transition metal catalyst compounds may be used in any ratio. Preferred molar ratios of catalyst represented by formula (A) (the two bridged transition metal catalysts) to catalysts represented by formula (B), (C) or (D) (the at least two other transition metal catalysts), for example, (A:B), (A:C) or (A:D) can be independently from 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalyst compounds chosen, the method of activation, and the end product desired. In a particular embodiment, useful mole percents of catalysts represented by formulas (A) and (B), based upon the molecular weight of the catalyst compounds, are (10 to 99.9% (A)):(0.1 to 90% (B)), alternatively (25 to 99% (A)):(0.5 to 50% (B)), alternatively (50 to 99% (A)):(1 to 25% (B)), and alternatively (75 to 99% (A)):(1 to 10% (B)). In a particular embodiment, useful mole percents of catalysts represented by formulas (A) and (C), based upon the molecular weight of the catalyst compounds, are (10 to 99.9% (A)):(0.1 to 90% (C)), alternatively (25 to 99% (A)):(0.5 to 50% (C)), alternatively (50 to 99% (A)):(1 to 25% (C)), and alternatively (75 to 99% (A)):(1 to 10% (C)). In a particular embodiment, useful mole percents of catalysts represented by formulas (A) and (D), based upon the molecular weight of the catalyst compounds, are (10 to 99.9% (A)):(0.1 to 90% (D)), alternatively (25 to 99% (A)):(0.5 to 50% (D)), alternatively (50 to 99% (A)):(1 to 25% (D)), and alternatively (75 to 99% (A)):(1 to 10% (D))).

For purposes of the present disclosure, one metallocene catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of the present disclosure, e.g., rac-bis(1-methylindenyl)hafnium dimethyl is considered to be the same as meso-bis(1-methyl-indenyehafnium dimethyl. Thus, as used herein, a single metallocene catalyst compound having a racemic and/or meso isomer does not, itself, constitute two different metallocene catalyst compounds.

In useful embodiments of the catalyst system, M is Hf for both catalysts represented by formula (A).

In useful embodiments of the catalyst system, $M^1$ is Zr for both catalysts represented by formula (B).

In useful embodiments of the catalyst system, M is Hf for both catalysts represented by formula (A) and $M^1$ is Zr for both catalysts represented by formula (B).

In useful embodiments of the catalyst system, M is Hf for both catalysts represented by formula (A), and $M^1$ is Hf and $M^2$ is Zr.

In useful embodiments of the catalyst system, M is Hf for both catalysts represented by formula (A), and $M^1$ and $M^2$ are Zr.

In useful embodiments of the catalyst system, $R^9$ is $CH_2-SiR'_3$ or $CH_2-CR'_3$ where each R is independently a $C_1$ to $C_{20}$ substituted or unsubstituted hydrocarbyl.

The Two Bridged Metallocenes of Formula (A)

In at least one embodiment, the supported catalyst systems comprise at least two different catalysts represented by formula (A):

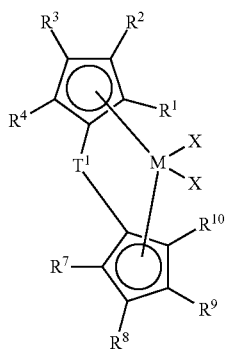

(A)

wherein:
M is Hf or Zr, preferably Hf;
each $R^1$, $R^2$, and $R^4$ is independently hydrogen, alkoxide or a $C_1$ to $C_{40}$ substituted or unsubstituted hydrocarbyl group;
$R^3$ is independently hydrogen, alkoxide or a $C_1$ to $C_{40}$ substituted or unsubstituted hydrocarbyl group or is $CH_2-SiR'_3$ or $CH_2-CR'_3$, and each R is independently a $C_1$ to $C_{20}$ substituted or unsubstituted hydrocarbyl;
each $R^7$, $R^8$, $R^9$ and $R^{10}$ is independently hydrogen, alkoxide, a $C_1$ to $C_{40}$ substituted or unsubstituted hydrocarbyl group, $CH_2-SiR'_3$, or $CH_2-CR'_3$, where each R is independently a $C_1$ to $C_{20}$ substituted or unsubstituted hydrocarbyl, provided that at least one of $R^7$, $R^8$, $R^9$ and $R^{10}$ is $CH_2-SiR'_3$ or $CH_2-CR'_3$, preferably $R^8$ and/or $R^9$ is $CH_2-SiR'_3$ or $CH_2-CR'_3$, preferably $R^9$ is $CH_2-SiR'_3$ or $CH_2-CR'_3$;
$T^1$ is a bridging group; and
each X is independently a univalent anionic ligand, or two Xs are joined and bound to the metal atom to form a metallocyclic ring, or two Xs are joined to form a chelating ligand, a diene ligand, or an alkylidene ligand.

In any embodiment of the invention, $T^1$ is a bridging group containing at least one Group 13, 14, 15, or 16 element, in particular boron or a Group 14, 15, or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O—O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Preferred examples for the bridging group $T^1$ include $CH_2$, $CH_2CH_2$, $SiMe_2$, $SiPh_2$, $SiMePh$, $Si(CH_2)_3$, $Si(CH_2)_4$, O, S, NPh, PPh, NMe, PMe, NEt, NPr, NBu, PEt, PPr, $Me_2SiOSiMe_2$, and PBu. In a preferred embodiment of the invention in any embodiment of any formula described herein, $T^1$ is represented by the formula $ER^d_2$ or $(ER^d_2)_2$, where E is C, Si, or Ge, and each $R^d$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^d$ can form a cyclic structure including aromatic, partially saturated, or saturated cyclic or fused ring system. Preferably, $T^1$ is a bridging group comprising carbon or silica, such as dialkylsilyl, preferably $T^1$ is selected from $CH_2$, $CH_2CH_2$, $C(CH_3)_2$, $SiMe_2$, cyclotrimethylenesilylene ($Si(CH_2)_3$), cyclopentamethylenesilylene ($Si(CH_2)_5$) and cyclotetramethylenesilylene ($Si(CH_2)_4$).

In a preferred embodiment, each $R^1$, $R^2$ and $R^4$ is independently hydrogen, alkoxide or a substituted $C_1$ to $C_{20}$ hydrocarbyl group or an unsubstituted $C_1$ to $C_{20}$ hydrocarbyl group, preferably each $R^1$, $R^2$ and $R^4$ is independently a $C_1$ to $C_{12}$ alkyl group, preferably hydrogen, methyl, ethyl, propyl, butyl, pentyl, hexyl, or an isomer thereof, preferably hydrogen or methyl.

In a preferred embodiment, $R^3$ is hydrogen, alkoxide or a substituted $C_1$ to $C_{12}$ hydrocarbyl group or an unsubstituted $C_1$ to $C_{12}$ hydrocarbyl group, preferably $R^3$ is a $C_1$ to $C_{20}$ alkyl group, preferably hydrogen, methyl, ethyl, propyl, butyl, pentyl, hexyl, or an isomer thereof, preferably hydrogen or methyl, or $R^3$ is —$R^{20}$—$SiR'_3$ or is —$R^{20}$—$CR'_3$ where $R^{20}$ is hydrogen or a $C_1$ to $C_4$ hydrocarbyl (preferably —CH—; —CH$_2$CH$_2$—, -(Me)CHCH$_2$—, -(Me)CH—, and each R' is independently hydrogen or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 of R' are not H, alternatively 3 of R' are not H.

Alternatively, $R^3$ is —CH$_2$—SiMe$_3$, —CH$_2$-SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

Alternatively, each of $R^1$, $R^2$, $R^3$, and $R^4$ is not H.

In a preferred embodiment, each $R^7$, $R^8$ and $R^{10}$ is independently hydrogen, alkoxide or a substituted $C_1$ to $C_{12}$ hydrocarbyl group or an unsubstituted $C_1$ to $C_{12}$ hydrocarbyl group, preferably a $C_1$ to $C_{20}$ alkyl group, preferably hydrogen, methyl, ethyl, propyl, butyl, pentyl, hexyl, or an isomer thereof, preferably a hydrogen or methyl.

In a preferred embodiment, $R^9$ is —R$^{20}$—SiR'$_3$ or is —R$^{20}$—CR'$_3$ where $R^{20}$ is a $C_1$ to $C_4$ hydrocarbyl (preferably —CH$_2$—, —CH$_2$CH$_2$—, -(Me)CHCH$_2$—, -(Me)CH—, and each R' is independently hydrogen or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R is not H, alternatively 2 of R are not H, alternatively 3 of R' are not H;

Alternatively, $R^9$ is —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

Alternatively, $R^3$ and $R^9$ are independently —R$^{20}$—SiR'$_3$ or is —R$^{20}$—CR'$_3$ where $R^{20}$ is a $C_1$ to $C_4$ hydrocarbyl (preferably —CH$_2$—, —CH$_2$CH$_2$—, -(Me)CHCH$_2$—, -(Me)CH—, and each R is independently hydrogen, or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R is a $C_1$ to $C_{20}$ alkyl or aryl, such as methyl, methyl phenyl, phenyl, biphenyl, pentamethylphenyl, tetramethylphenyl, or di-t-butylphenyl; alternatively $R^3$ and $R^9$ are selected from the group consisting of: —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiH(CH$_3$)$_2$, —CH$_2$SiPh$_3$, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(CH$_2$)$_3$Ph, —CH$_2$—Si(CH$_2$)$_4$Ph, —CH$_2$—Si(Cy)Ph$_2$, or —CH$_2$—Si(Cy)$_2$Ph.

Alternatively, $R^3$ and $R^9$ are not hydrogen.

Alternatively, $R^3$ and $R^9$ are independently, not a $C_1$ to $C_{40}$ substituted or unsubstituted hydrocarbyl group.

Alternatively, each X may be independently a halide, a hydride, an alkyl group, an alkenyl group or an arylalkyl group.

Alternatively, each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

Useful asymmetric catalysts are preferably such that a mirror plane cannot be drawn through the metal center and the cyclopentadienyl moieties bridged to the metal center are structurally different.

In a useful embodiment, M is Hf or Zr, each $R^1$, $R^2$, $R^3$, and $R^4$ is a H or a $C_1$ to $C_{20}$ alkyl group and $R^9$ is —R$^{20}$—SiR'$_3$ or —R$^{20}$—CR'$_3$ where $R^{20}$ is CH$_2$, and R is a $C_1$ to $C_{20}$ alkyl or aryl.

In a useful embodiment, n M is Hf or Zr, each $R^1$, $R^2$, $R^3$, and $R^4$ is hydrogen or a $C_1$ to $C_{20}$ alkyl group and $R^9$ is —R$^{20}$—SiR'$_3$ or —R$^{20}$—CR'$_3$ where $R^{20}$ is CH$_2$, and R' is a $C_1$ to $C_{20}$ alkyl or aryl and $R^3$ is —R$^{20}$—SiR'$_3$ or —R$_{20}$—CR'$_3$ where $R_{20}$ is CH$_2$, and R is a $C_1$ to $C_{20}$ alkyl or aryl.

Catalyst compounds represented by formula (A) can be one or more of: rac/meso-Me$_2$Si(3-Me$_3$Si—CH$_2$—Cp)$_2$HfMe$_2$; rac-Me$_2$Si(3-Me$_3$Si—CH$_2$—Cp)$_2$HfMe$_2$; rac/meso-Ph$_2$Si(3-Me$_3$Si—CH$_2$-Cp)$_2$HfMe$_2$; rac/meso-PhMeSi(3-Me$_3$Si—CH$_2$—Cp)$_2$HfMe$_2$; rac/meso-(CH$_2$)$_4$Si(3-Me$_3$Si—CH$_2$-Cp)$_2$HfMe$_2$; rac/meso-(CH$_2$)$_3$Si(3-Me$_3$Si—CH$_2$-Cp)$_2$HfMe$_2$; Me(H)Si(3-Me$_3$Si—CH$_2$-Cp)$_2$HfMe$_2$; Ph(H)Si(3-Me$_3$Si—CH$_2$—Cp)$_2$HfMe$_2$; rac/meso-(biphenyl)$_2$Si(3-Me$_3$Si—CH$_2$—Cp)$_2$HfMe$_2$; rac/meso-(F—C$_6$H$_4$)$_2$Si(3-Me$_3$Si—CH$_2$-Cp)$_2$HfMe$_2$; rac/meso-Me$_2$Ge(3-Me$_3$Si—CH$_2$—Cp)$_2$HfMe$_2$; rac-Me$_2$Ge(3-Me$_3$Si—CH$_2$—Cp)$_2$HfMe$_2$; rac/meso-Ph$_2$Ge(3-Me$_3$Si—CH$_2$—Cp)$_2$HfMe$_2$; Me$_2$Si(Me$_4$Cp)(3-Me$_3$Si—CH$_2$-Cp)HfMe$_2$; Ph$_2$Si(Me$_4$Cp)(3-Me$_3$Si—CH$_2$—Cp)HfMe$_2$; Me$_2$Ge(Me$_4$Cp)(3-Me$_3$Si—CH$_2$—Cp)HfMe$_2$; Ph$_2$Ge(Me$_4$Cp)(3-Me$_3$Si—CH$_2$-Cp)HfMe$_2$; PhMeSi(Me$_4$Cp) (3-Me$_3$Si—CH$_2$—Cp)HfMe$_2$; (CH$_2$)$_3$Si(Me$_4$Cp) (3-Me$_3$Si—CH$_2$-Cp)HfMe$_2$; (CH$_2$)$_4$Si(Me$_4$Cp) (3-Me$_3$Si—CH$_2$-Cp)HfMe$_2$; Et$_2$Si(Me$_4$Cp) (3-Me$_3$Si—CH$_2$-Cp)HfMe$_2$; and the halide versions thereof where the Me$_2$ is replaced with Et$_2$, Cl$_2$, Br$_2$, I$_2$, or Phe.

The Two Different Metallocenes of Formula B

One or both of the at least two metallocenes which are useful herein as poor comonomer incorporators are represented by the formula (B):

$$T^2_y Cp_m M^1 X_q \qquad (B)$$

wherein:

each Cp is independently a cyclopentadienyl, indenyl or fluorenyl group which may be independently substituted or unsubstituted;

$M^1$ is zirconium or hafnium;

$T^2$ is a bridging group;

y is 0 or 1, indicating the absence or presence of T;

X is a halide, a hydride, an alkyl group, an alkenyl group or an arylalkyl group;

m=2 or 3, q=0, 1, 2, or 3, and the sum of m+q is equal to the oxidation state of the transition metal; and each Cp and X is bound to $M^1$.

In an embodiment, one or both of the at least two metallocenes which are useful herein as poor comonomer incorporators are represented by the formula (C):

$$Cp_mM^2X_q \quad (C)$$

wherein:
each Cp is independently a cyclopentadienyl, indenyl or fluorenyl group which may be independently substituted or unsubstituted;
$M^2$ is zirconium or hafnium;
X is a halide, a hydride, an alkyl group, an alkenyl group or an arylalkyl group;
m=2 or 3, q=0, 1, 2, or 3, and the sum of m+q is equal to the oxidation state of the transition metal; and
each Cp and X is bound to $M^1$.

One or both of the at least two metallocenes which are useful herein as poor comonomer incorporators can be represented by the formula (D):

$$T^3Cp_mM^3X_q \quad (D)$$

wherein:
each Cp is independently a cyclopentadienyl, indenyl or fluorenyl group which may be independently substituted or unsubstituted;
$M^3$ is zirconium or hafnium;
$T^3$ is a bridging group;
X is a halide, a hydride, an alkyl group, an alkenyl group or an arylalkyl group;
m=2 or 3, q=0, 1, 2, or 3, and the sum of m+q is equal to the oxidation state of the transition metal; and
each Cp and X is bound to $M^2$.

The descriptions below apply to the formulas described herein, including formulas (B), (C), and (D).

In an embodiment, each X may be independently a halide, a hydride, an alkyl group, an alkenyl group or an arylalkyl group.

In any embodiment of the invention, $T^2$ and $T^3$ are, independently, a bridging group containing at least one Group 13, 14, 15, or 16 element, in particular boron or a Group 14, 15, or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, O-O, S—S, R*N—NR*, R*P—PR*, O—S, O—NR*, O—PR*, S—NR*, S—PR*, and R*N—PR* where R* is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Preferred examples for the bridging group $T^2$ and $T^3$ include $CH_2$, $CH_2CH_2$, $SiMe_2$, $SiPh_2$, SiMePh, $Si(CH_2)_3$, $Si(CH_2)_4$, O, S, NPh, PPh, NMe, PMe, NEt, NPr, NBu, PEt, PPr, $Me_2SiOSiMe_2$, and PBu. In a preferred embodiment of the invention in any embodiment of any formula described herein, $T^2$ and $T^3$ are, independently, represented by the formula $ER^d{}_2$ or $(ER^d{}_2)_2$, where E is C, Si, or Ge, and each $R^d$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^d$ can form a cyclic structure including aromatic, partially saturated, or saturated cyclic or fused ring system. Preferably, $T^2$ and $T^3$ are, independently, a bridging group comprising carbon or silica, such as dialkylsilyl, preferably $T^2$ and $T^3$ are, independently, selected from $CH_2$, $CH_2CH_2$, $C(CH_3)_2$, $SiMe_2$, cyclotrimethylenesilylene ($Si(CH_2)_3$), cyclopentamethylenesilylene ($Si(CH_2)_5$) and cyclotetramethylenesilylene ($Si(CH_2)_4$).

Alternatively, each X is independently selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two Xs may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

Typically, each Cp is independently a substituted or unsubstituted cyclopentadiene, a substituted or unsubstituted indene, or a substituted or unsubstituted fluorene.

Independently, each Cp may be substituted with one or more substituent groups R. Non-limiting examples of substituent groups R include one or more of hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbons, which can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, preferably two adjacent R groups, may be joined to form a ring structure having from 3 to 30 atoms selected from carbon, nitrogen, oxygen, phosphorus, silicon, germanium, aluminum, boron or a combination thereof.

In an embodiment of Cp, the substituent(s) R are independently hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S or P heteroatom or heteroatom containing group (typically having up to 12 atoms, including the N, O, S and P heteroatoms).

Non-limiting examples of Cp include (substituted or unsubstituted) cyclopentadienyl, cyclopentaphenanthreneyl, indenyl, benzindenyl, fluorenyl, octahydrofluorenyl, cyclooctatetraenyl, cyclopentacyclododecene, azenyl, azulene, pentalene, phosphoyl, phosphinimine (WO 99/40125), pyrrolyl, pyrazolyl, carbazolyl, borabenzene and the like, including hydrogenated versions thereof, for example tetrahydroindenyl. In another embodiment, each Cp may, independently include one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other Cp ligands include but are not limited to porphyrins, phthalocyanines, corrins and other polyazamacrocycles.

Independently, each Cp of formulas (B), (C) and (D) may be unsubstituted or substituted with any one or combination of substituent groups R. Non-limiting examples of substituent groups R as used in the structure include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

Preferable examples of alkyl substituents R include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically unsaturated substituents including vinyl-terminated ligands, for example, 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R, such as 1-butanyl, may form a bonding association to the element M.

The Cp ligands are different from each other in one embodiment, and the same in another embodiment.

It is contemplated that the metallocene catalyst compounds described above include their structural or optical or enantiomeric isomers (racemic mixture), and may be a pure enantiomer in one embodiment.

In a useful embodiment, $M^1$ and $M^2$ are both zirconium, preferably $M^1$ and $M^2$ are both zirconium and M is hafnium.

In a useful embodiment, $M^1$ and $M^2$ are both zirconium and wherein $T^3$ the bridge contains at least 2 or more carbon, silicon, oxygen, nitrogen atoms, preferably $T^3$ is $Si(Me)_2OSi(Me)_2$-, —$Si(Me)_2Si(Me)_2$-, or —$CH_2CH_2$—.

In a useful embodiment, $M^1$ in formula B is Zr and Cp is indenyl.

Suitable unbridged metallocenes useful herein include, but are not limited to, the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; U.S. Publication No. 2007/0055028, and PCT Published Application Nos. WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; U.S. Publication No. 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Exemplary compounds represented by formula (B) include: bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium dichloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl) zirconium dichloride, meso-bis(1-ethylindenyl) zirconium dimethyl, (1-methylindenyl) (pentamethylcyclopentadienyl) zirconium dichloride, and (1-methylindenyl)(pentamethylcyclopentadienyl) zirconium dimethyl, and dimethylsilyl-bis(indenyl)zirconium dichloride, rac/meso-(Me$_2$Si)$_2$O (Ind)$_2$ ZrCl$_2$; meso-(Me$_2$Si)$_2$O(Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$Si—O—SiPh$_2$)O(Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O(1-PrInd)$_2$ZrCl$_2$; rac/meso-(MePhSi)$_2$O(1-PrInd)$_2$ZrCl$_2$; rac/meso-(tBu$_2$Si—O—SiPh$_2$)O(1-PrInd)$_2$ZrCl$_2$; rac/meso-(Me$_2$Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$(1-MeInd)$_2$ZrCl$_2$; rac/meso-(tBuPhSi)$_2$(1-MeInd)$_2$ZrCl$_2$; rac/meso-(NpPhSi)$_2$(1-MeInd)$_2$ZrCl$_2$.

Exemplary compounds represented by formula (C) include: bis(cyclopentadienyl)zirconium dichloride; bis(cyclopentadienyl)zirconium dimethyl; bis(n-butylcyclopentadienyl)zirconium dichloride; bis(n-butylcyclopentadienyl) zirconium dimethyl; bis(pentamethylcyclopentadienyl) zirconium dichloride; bis(pentamethylcyclopentadienyl) zirconium dimethyl; bis(pentamethylcyclopentadienyl) hafnium dichloride; bis(pentamethylcyclopentadienyl) zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-phenylcyclopentadienyl)zirconium dichloride; bis (1-methyl-3-phenylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride; bis(indenyl)zirconium dimethyl; bis(tetrahydro-1-indenyl)zirconium dichloride; bis(tetrahydro-1-indenyl)zirconium dimethyl; (n-propyl cyclopentadienyl) (pentamethyl cyclopentadienyl) zirconium dichloride; (n-propyl cyclopentadienyl)(pentamethyl cyclopentadienyl)zirconium dimethyl; rac/meso-bis(1-ethylindenyl)zirconium dichloride; rac/meso-bis(1-ethylindenyl)zirconium dimethyl; rac/meso-bis(1-methylindenyl)zirconium dichloride; rac/meso-bis(1-methylindenyl)zirconium dimethyl; rac/meso-bis(1-propylindenyl)zirconium dichloride; rac/meso-bis(1-propylindenyl)zirconium dimethyl; rac/meso-bis(1-butylindenyl)zirconium dichloride; rac/meso-bis(1-butylindenyl)zirconium dimethyl; meso-bis(1-ethylindenyl) zirconium dichloride; meso-bis(1ethylindenyl) zirconium dimethyl; (1-methylindenyl)(pentamethyl cyclopentadienyl) zirconium dichloride; and (1-methylindenyl)(pentamethyl cyclopentadienyl) zirconium dimethyl.

Exemplary compounds represented by formula (D) include: rac/meso-(Me$_2$Si)$_2$O(Ind)$_2$ZrCl$_2$; meso-(Me$_2$Si)$_2$O (Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$Si—O—SiPh$_2$)O (Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O (1-PrInd)$_2$ZrCl$_2$; rac/meso-(MePhSi)$_2$O(1-PrInd)$_2$ZrCl$_2$; rac/meso-(tBu$_2$Si—O—SiPh$_2$)O(1-PrInd)$_2$ZrCl$_2$; rac/meso-(Me$_2$Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$(1-MeInd)$_2$ZrCl$_2$; rac/meso-(tBuPhSi)$_2$(1-MeInd)$_2$ZrCl$_2$; rac/meso-(NpPhSi)$_2$(1-MeInd)$_2$ZrCl$_2$.

Support Material

In embodiments of the present disclosure, the catalyst systems include a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include Al$_2$O$_3$, ZrO$_2$, SiO$_2$, and combinations thereof, more preferably, SiO$_2$, Al$_2$O$_3$, or SiO$_2$/Al$_2$O$_3$.

It is preferred that the support material, most preferably, an inorganic oxide, has a surface area from about 10 m$^2$/g to about 700 m$^2$/g, pore volume from about 0.1 cc/g to about 4.0 cc/g, and average particle size from about 5 μm to about 500 μm. More preferably, the surface area of the support material is from about 50 m$^2$/g to about 500 m$^2$/g, pore volume of from about 0.5 cc/g to about 3.5 cc/g, and average particle size of from about 10 μm to about 200 μm. Most preferably, the surface area of the support material is from about 100 m$^2$/g to about 400 m$^2$/g, pore volume from about 0.8 cc/g to about 3.0 cc/g, and average particle size is from about 5 μm to about 100 μm. The average pore size of the support material can be from 10 to 1,000 Å, preferably, 50 to about 500 Å, and most preferably, 75 to about 350 Å. In some embodiments, the support material is a high surface area, amorphous silica (surface area ≥300 m$^2$/gm, pore volume ≥1.65 cm$^3$/gm), and is marketed under the tradenames of DAVISON 952 or DAVISON 955 by the Davison Chemical Division of W. R. Grace and Company, are particularly useful. In other embodiments, DAVIDSON 948 is used.

In some embodiments of the present disclosure, the support material may be dry, that is, free of absorbed water. Drying of the support material can be achieved by heating or calcining at about 100° C. to about 1000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably from 0.05 to 6.0 millimole F/g of support, and most desirably from 0.1 to 3.0 millimole F/g of support. The fluorine compound can be dry mixed with the support either before or after charging to a vessel for dehydration or calcining the support. Accordingly, the fluorine concentration present on the support is from 0.1 to 25 wt %, alternatively from 0.19 to 19 wt %, alternatively from 0.6 to 3.5 wt %, based upon the weight of the support.

The above two metal catalysts described herein are generally deposited on the support material at a loading level of 10-100 micromoles of metal per gram of solid support; alternatively 20-80 micromoles of metal per gram of solid support; or 40-60 micromoles of metal per gram of support. But greater or lesser values may be used provided that the total amount of solid complex does not exceed the support's pore volume.

In at least one embodiment, the support material includes a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In at least one embodiment, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, and the like, or any combination thereof, at least one embodiment of this disclosure. In at least one embodiment, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In at least one embodiment, the activator-support can be, or can include, fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, H+, $[H(OEt_2)_2]$+, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in at least one embodiment, two or more electron-withdrawing anion source compounds in two or more separate contacting steps.

In one embodiment of the present disclosure, one example of a process by which a chemically-treated support material is prepared is as follows: a selected support material, or combination of support materials, can be contacted with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include, but is not limited to, gelling, co-gelling, impregnation of one compound onto another, and the like, or combinations thereof. Following a contacting method, the contacted mixture of the support material, electron-withdrawing anion, and optional metal ion, can be calcined.

According to another embodiment of the present disclosure, the support material can be treated by a process including: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Activators

The supported catalyst systems may be formed by combining the above two metal catalysts with activators in any manner known from the literature including by supporting them for use in slurry or gas phase polymerization. Activators are defined to be any compound which can activate any one of the catalysts described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Another useful alumoxane is solid polymethylaluminoxane as described in U.S. Pat. Nos. 9,340,630; 8,404,880; and 8,975,209.

When the activator is an alumoxane (modified or unmodified), some embodiments select the maximum amount of activator typically at up to a 5000-fold molar excess Al/M over the catalyst (per metal catalytic site). The minimum activator-to-catalyst-compound is a 1:1 molar ratio. Alternate preferred ranges include from 1:1 to 500:1, alternatively from 1:1 to 200:1, alternatively from 1:1 to 100:1, or alternatively from 1:1 to 50:1.

In an alternate embodiment, little or no alumoxane is used in the polymerization processes described herein. Preferably, alumoxane is present at zero mol %, alternatively the alumoxane is present at a molar ratio of aluminum to catalyst compound transition metal less than 500:1, preferably less than 300:1, preferably less than 100:1, preferably less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with embodiments of the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43963), boric acid (U.S. Pat. No. 5,942,459), or combination thereof. It is also within the scope of the present disclosure to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [$Me_3NH^+$][$B(C_6F_5)_4^-$], 1-(4-(tris(pentafluorophenyl)borate)-2,3,5,6-tetrafluorophenyl)pyrrolidinium; and [$Me_3NH^+$][$B(C_6F_5)_4^-$], 1-(4-(tris(pentafluorophenyl)borate)-2,3,5,6-tetrafluorophenyl) pyrrolidinium; and sodium tetrakis(pentafluorophenyl) borate, potassium tetrakis(pentafluorophenyl)borate, 4-(tris (pentafluorophenyl)borate)-2,3,5,6-tetrafluoropyridinium, sodium tetrakis(perfluorophenyl)aluminate, potassium tetrakis(pentafluorophenyl), and N,N-dimethylanilinium tetrakis(perfluorophenyl)aluminate.

In a preferred embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N, N-dialkyl-(2,4,6-trimethyl anilinium) tetrakis(3,5-bis(trifluoromethyl)phenyl)borate, di-(i-propyl)ammonium tetrakis (pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternatively from 0.5:1 to 200:1, alternatively from 1:1 to 500:1 alternatively from 1:1 to 1000:1. A particularly useful range is from 0.5:1 to 10:1, preferably 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, and diethyl zinc.

In some embodiments, the catalyst systems will additionally include one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and PCT Publication Nos. WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z-Al-)_yO-)_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above four or more metal catalyst compounds can be combined to form a mixed catalyst system.

The four or more metal catalyst compounds can be added together in a desired ratio when combined, contacted with an activator, or contacted with a support material or a supported activator. The metal catalyst compounds may be added to the mixture sequentially or at the same time.

Alternative preparations can include addition of a first metal catalyst compound to a slurry including a support or a supported activator mixture for a specified reaction time, followed by the addition of the second metal catalyst compound solution, mixed for another specified time, followed by addition of the third metal catalyst compound and then the fourth metal catalyst compound after which the mixture may be recovered for use in a polymerization reactor, such as by spray drying. Lastly, another additive, such as 1-hexene in about 10 vol % can be present in the mixture prior to the addition of the first metal catalyst compound.

The first metal catalyst compound may be supported via contact with a support material for a reaction time. The resulting supported catalyst composition may then be mixed with a diluent (such as mineral oil) to form a slurry, which may or may not include an activator. The slurry may then be admixed with a second, third and fourth metal catalyst compound prior to introduction of the resulting mixed catalyst system to a polymerization reactor. The second, third and fourth metal catalyst compounds, may be admixed at any point prior to introduction to the reactor, such as in a polymerization feed vessel or in-line in a catalyst delivery system.

The mixed catalyst system may be formed by combining a first metal catalyst compound (for example a metal catalyst compound useful for producing a first polymer attribute, such as a high molecular weight polymer fraction and/or high comonomer content) with a support and activator, desirably in a first diluent such as an alkane or toluene, to produce a supported, activated catalyst compound. The supported activated catalyst compound, either isolated from the first diluent or not, is then combined in one embodiment with a second diluent, such as a high viscosity diluent such as mineral or silicon oil, or an alkane diluent (such as toluene) including from 5 to 99 wt % mineral or silicon oil, to form a slurry of the supported metal catalyst compound, followed by, or simultaneous to combining with a similar polymer attribute such as high molecular weight polymer fraction or high comonomer content, or a second metal catalyst compound (for example, a metal catalyst compound useful for producing a second polymer attribute, such as a low molecular weight polymer fraction or low comonomer content), either in a diluent or as the dry solid compound, to form a supported activated mixed catalyst system ("mixed catalyst system"). Other alkane diluents include isopentane, hexane, n-heptane, octane, nonane, and decane, cycloalkanes, such as cyclohexane, aromatics, such as benzene, toluene, xylene, and ethylbenzene. The third metal catalyst compound and then the fourth metal catalyst compound are added in a similar manner. The mixed catalyst system thus produced may be a supported and activated first metal catalyst compound in a slurry, the slurry including mineral or silicon oil, with a second, third and fourth metal catalyst compound that are not supported and not combined with additional activator, where the second, third and fourth metal catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 atomic mass units (amu) to 500 amu or more, and a viscosity at 40° C. of from 40 to 300 centistrokes (cSt) or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils are those that exclude moieties that are reactive with metallocene catalysts, examples of which include hydroxyl and carboxyl groups.

The diluent may include a blend of a mineral, silicon oil, and/or a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend including mineral oil, the diluent may include from 5 to 99 wt % mineral oil. In some embodiments, the diluent may consist essentially of mineral oil.

In one embodiment, the first metal catalyst compound is combined with an activator and a first diluent to form a catalyst slurry that is then combined with a support material. Until such contact is made, the support particles are optionally not previously activated. The first metal catalyst compound can be in any desirable form such as a dry powder, suspension in a diluent, solution in a diluent, liquid, etc. The catalyst slurry and support particles are then mixed thoroughly, in one embodiment at an elevated temperature, so that both the first metal catalyst compound and the activator are deposited on the support particles to form a support slurry.

Alternately, the four catalyst compounds are together dissolved in toluene and, after dissolution, are added to the MAO silica. Alternatively catalysts may be added in any order in steps or together to form a slurry which optionally can be filtered and dried under vacuum. Optionally the catalyst may be added to a heated slurry from room temperature to 150° C., more preferably 80° C.

Alternatively, after the first metal catalyst compound and activator are deposited on the support, a second metal catalyst compound may then be combined with the supported first metal catalyst compound, wherein the second metal catalyst is combined with a diluent including alkane, mineral and/or silicon oil by any suitable means either before, simultaneously to, or after contacting the second metal catalyst compound with the supported first metal catalyst compound. The third and then the fourth metal catalysts compounds are then added in a similar manner as the second metal catalyst. In one embodiment, the first metal catalyst compound is isolated from the first diluent to a dry state before combining with the second metal catalyst compound. Preferably, the second, third and fourth metal catalysts compounds are not activated, that is, not combined with any activator, before being combined with the supported first metal catalyst compound. The resulting solids slurry (including both the supported first, second, third and fourth metal catalyst compounds) is then preferably, mixed thoroughly at an elevated temperature.

A wide range of mixing temperatures may be used at various stages of making the mixed catalyst system. For example, when the first metal catalyst compound and at least one activator, such as methylalumoxane, are combined with a first diluent to form a mixture, the mixture is preferably heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, the mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal catalyst compound deposited thereto. The first diluent can then be removed from the first support slurry to provide a dried supported first catalyst compound. For example, the first diluent can be removed under vacuum or by nitrogen purge.

Next, the second metal catalyst compound is combined with the activated first metal catalyst compound in the presence of a diluent (such as alkane, mineral or silicon oil). Preferably, the second metal catalyst compound is added in a molar ratio to the first metal catalyst compound in the range from 1:4 to 4:1, depending on whether the second metal catalyst compound produces a similar or different polymer attribute as previously discussed. Most preferably, the molar ratio is approximately 1:1 where the metal catalysts compounds produce a similar attribute and 2:1 where the metal catalyst compounds produce a different polymer attribute. The third and fourth metal catalyst compounds are then added in a similar manner. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours. The resulting mixed catalyst system will have molar ratios of 4:4:1:1 (first high molecular weight metal catalyst compound: second high molecular weight metal catalyst compound: first low molecular weight metal catalyst compound: second low molecular weight catalyst compound).

The first diluent is an aromatic or alkane, preferably, hydrocarbon diluent having a boiling point of less than 200° C. such as toluene, xylene, hexane, etc., and may be removed from the supported first metal catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an $N_2$ purge or vacuum, for example. Depending upon the level of mineral oil added, the resultant mixed catalyst system may still be a slurry or may be a free flowing powder that includes an amount of mineral oil. Thus, the mixed catalyst system, while a slurry of solids in mineral oil in one embodiment, may take any physical form such as a free flowing solid. For example, the mixed catalyst system may be from 1 to 99 wt % solids content by weight of the mixed catalyst system (mineral oil, support, all catalyst compounds and activator (s)) in one embodiment.

Polymerization Process

The present disclosure provides a process to produce ethylene polymer compositions including: i) contacting in a single reaction zone, in the gas phase or slurry phase, ethylene and $C_3$ to $C_{20}$ comonomer with a catalyst system including a support, an activator, and the catalyst system described above, and obtaining an ethylene polymer composition having: 1) at least 50 mol % ethylene, 2) a density of 0.890 g/cc or more, alternatively 0.910 g/cc or more, alternatively 0.935 g/cc or more, 3) a melt flow index of from 0.1 to 80 dg·min, and 4) an Mw/Mn of 2.5 to 21.5. Without wishing to be bound by theory, it is believed that the ethylene polymer produced herein (i.e., an in-situ ethylene polymer composition) has at least four polymer components where the first and second components are derived from the catalysts represented by formula A and have more comonomer (such as hexene) and higher Mw as compared to the third and fourth components derived from the catalysts represented by formula (B) (preferably from (C) and (D)) which have less comonomer (such as hexene) and lower Mw as compared to the first component.

In at least one embodiment, a polymerization process includes contacting a monomer (such as ethylene), and, optionally, comonomer (such as hexene), with a supported catalyst system including two group 4 metallocene compounds (such as two catalysts represented by formula (A)), two different group 4 (such as Zr) metallocene compounds (such as two catalysts represented by formula (B) or one catalyst represented by formula (C) and one catalyst represented by formula (D)), an activator, and a support material as described above.

Monomers include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment, the monomers include ethylene and, optional, comonomers including one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a preferred embodiment one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment, a process provides polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

In a particularly preferred embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of the present disclosure can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is a process where at least 90 wt % of the product is soluble in the reaction media.) A bulk homogeneous process is particularly preferred. (A bulk process is a process where monomer concentration in all feeds to the reactor is 70 volume % or more.) Alternatively, no solvent or diluent is present or added in the reaction medium (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

In another embodiment, the process is a gas phase process.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.) In a preferred embodiment, this invention relates to a process for the production of an ethylene alpha-olefin copolymer comprising: polymerizing ethylene and at least one alpha-olefin by contacting the ethylene and the at least one alpha-olefin with a catalyst system described herein in at least one gas phase reactor at a reactor pressure of from 0.7 to 70 bar and a reactor temperature of from 20° C. to 150° C. to form an ethylene alpha-olefin copolymer, preferably a copolymer having a density of 0.890 g/cc (preferably 0.900 to 0.940 g/cc) or more, a melt flow index from 0.1 to 80 g/10 min, and a Mw/Mn from 2.5 to 12.5, and optionally having a Mw/Mz of 2 to 3, and/or a Mw value of 50,000 to 250,000 g/mol.

Slurry Phase Polymerization

A slurry polymerization process generally operates between 1 to about 50 atmosphere pressure range (15 psi to 735 psi, 103 kPa to 5068 kPa) or even greater and temperatures from 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

In a preferred embodiment, this invention relates to a process for the production of an ethylene alpha-olefin copolymer comprising: polymerizing ethylene and at least one alpha-olefin by contacting the ethylene and at least one alpha-olefin with a catalyst system described herein in at least one slurry phase reactor at a reactor pressure of from 0.7 to 70 bar and a reactor temperature of from 60° C. to 130° C. to form an ethylene alpha-olefin copolymer, said copolymer preferably having a density of 0.890 g/cc or more, a melt flow index from 0.1 to 80 g/10 min, and a Mw/Mn from 2.5 to 12.5.

Polyolefin Products

The present disclosure further provides compositions of matter produced by the methods described herein.

As used herein, "high molecular weight" is defined as a number average molecular weight (Mn) value of 150,000 g/mol or more. "Low molecular weight" is defined as an Mn value of less than 150,000 g/mol.

As used herein, "low comonomer content" is defined as a polyolefin having 6 wt % or less of comonomer based upon the total weight of the polyolefin. As used herein, "high comonomer content" is defined as a polyolefin having greater than 6 wt % of comonomer based upon the total weight of the polyolefin.

In a preferred embodiment, the process described herein produces ethylene homopolymers or ethylene copolymers, such as ethylene-alpha-olefin (preferably $C_3$ to $C_{20}$) copolymers (such as ethylene-butene copolymers, ethylene-hexene and/or ethylene-octene copolymers) having an Mw/Mn of greater than 1 to 20 (preferably greater than 1 to 12).

In a preferred embodiment, the polymers produced herein comprise ethylene and from 0 to 25 mol % (alternatively from 0.5 to 20 mol %, alternatively from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In a preferred embodiment, the monomer is ethylene and the comonomer is hexene, preferably from 1 to 15 mol % hexene, alternatively 1 to 10 mol %.

In a preferred embodiment, the polymer formed has: a) an RCI,m greater than 30 and an Mw/Mn of greater than 3; or b) an RCI,m greater than 50 and an Mw/Mn of greater than 5.

In a preferred embodiment, the present invention provides a polyethylene composition comprising:
ethylene derived units and from 0.5 to 20 wt % of $C_3$ to $C_{12}$ α-olefin derived units (alternately from 99 to 85 wt % ethylene derived units and 1 to 15 wt % $C_3$ to $C_{12}$ α-olefin derived units), based upon the weight of the polymer;
a MI from 0.1 to 6 g/10 min (alternately 0.5 to 5 g/10 min, alternately 0.75 to 4 g/10 min);
a density from 0.890 to 0.940 g/ml (alternately 0.90 to 0.935 g/ml, alternately 0.91 to 0.930 g/ml);
a HLMI from 5 to 40 g/10 min (alternately 10 to 37 g/ml, alternately 15 to 35 g/ml);
a $Tw_1$-$Tw_2$ value less than −30° C. (alternately less than −34° C., alternately less than −38° C.);
an $Mw_1$/$Mw_2$ value of from 0.9 to 4 (alternately from 1.4 to 3.5, alternately from 1.9 to 3.0);
an Mw/Mn of 5 to 30 (alternately 4 to 20, alternately 5 to 10);
an Mz/Mw between 2.5 and 10 (alternately 2.5 and 8, alternately 2.5 and 4);
an Mz/Mn is between 15 and 40 (alternately 15 and 30, alternately 15 and 25); and
a g'(vis) greater than 0.90 (alternately greater than 0.93, alternately greater than 0.95).

In a preferred embodiment, the present invention provides a polyethylene composition comprising:
ethylene derived units and from 0.5 to 20 wt % of $C_3$ to $C_{12}$ α-olefin derived units;
an MI from 0.1 to 6 g/10 min;
a density from 0.890 to 0.940 g/cc;
a HLMI from 5 to 40 g/10 min;
a $Tw_1$-$Tw_2$ value greater than −36° C.;
an $Mw_1$/$Mw_2$ value of from 0.9 to 4;
a Mw/Mn between 5 and 10;
a Mz/Mw between 2.5 and 3.5;
a Mz/Mn between 15 and 25; and
a g'(vis) greater than 0.90.

In a preferred embodiment, the present invention provides a polyethylene composition comprising:
ethylene derived units and from 0.5 to 20 wt % of $C_3$ to $C_{12}$ α-olefin derived units;
an MI from 0.1 to 20 g/10 min;
a density from 0.890 to 0.940 g/cc;
a melt index ratio, I21/I2, from 25 to 45 g/10 min;
a $Tw_1$-$Tw_2$ value less than −30° C.;
an $Mw_1$/$Mw_2$ value of from 0.9 to 4;
a Mw/Mn between 5 and 10;
a Mz/Mw between 2.5 and 3.5;
a Mz/Mn between 15 and 25; and
a g'(vis) greater than 0.90.

In particular, the present disclosure provides an in-situ ethylene polymer composition having: 1) at least 50 mol % ethylene; and 2) a density of 0.89 g/cc or more, preferably 0.910 g/cc or more (ASTM 1505). Preferably, the copolymer has higher comonomer (e.g., hexene) content in the higher molecular weight (Mn greater than 150,000 g/mol) components of the resin as compared to the lower molecular weight components, preferably at least 10% higher, preferably at least 20% higher, preferably at least 30% higher.

The copolymer produced herein typically has a composition distribution breadth $T_{75}-T_{25}$, as measured by TREF, that is greater than 20° C., preferably greater than 30° C., preferably greater than 40° C. The $T_{75}-T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}-T_{25}$ value represents the difference. The closer these temperatures comes together, the narrower the composition distribution.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternatively 1.2 to 20, alternatively 1.3 to 10, alternatively 1.4 to 12, 2 to 10, alternatively 2.5 to 10) as determined by GPC-4D.

Polymers produced herein typically have an Mz/Mw (as determined by GPC-4D) from about 1 to about 10, such as from about 2 to about 6, such as from about 2 to about 4, such as from about 2 to about 3. The ratio of Mz/Mw is a measure of the breadth of the high molecular weight fraction of the polymer molecular weight distribution, which is indicative of tear strength of the polymer. Furthermore, Mz/Mn indicates viscosity of a polymer. For example, a high Mz/Mn value indicates a low viscosity whereas a low Mz/Mn value indicates high viscosity. Accordingly, a polymer with a larger Mz/Mn ratio would be expected to have a lower viscosity at high shear rates than a polymer with a similar weight average molecular weight but a smaller Mz/Mn ratio.

Polymers produced herein typically have an Mz/Mn from about 1 to about 10, such as from about 2 to about 6, such as from about 3 to about 5.

The polymer produced herein may have a unimodal or multimodal molecular weight distribution as determined by Gel Permeation Chromatography (GPC-4D). By "multimodal" is meant that the GPC trace has at least two peaks or more than 2 inflection points. An inflection point is that point where the second derivative of the curve changes in sign (e.g., from negative to positive or vice versa).

Usefully, in a preferred embodiment, the polymer produced herein has a unimodal molecular weight distribution as determined by Gel Permeation Chromatography (GPC-4D) and an Mw/Mn of 5 or more, preferably 7 or more.

In another embodiment, the polymer produced herein has more than two peaks in the TREF measurement (see below). More than two peaks in the TREF measurement as used in this specification and the appended claims means the presence of more than two distinct normalized IR response peaks in a graph of normalized IR response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the distinct peaks are at least 3° C. apart, more preferably at least 4° C. apart, even more preferably at least 5° C. apart. Additionally, the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. More than two peaks on such a graph indicates a multi-modal composition distribution (CD). An alternate method for TREF measurement can be used if the method below does not show more than two peaks, i.e., see B. Monrabal, "Crystallization Analysis Fractionation: A New Technique for the Analysis of Branching Distribution in Polyolefins," Journal of Applied Polymer Science, Vol. 52, pp. 491-499 (1994).

TREF Method

Temperature Rising Elution Fractionation (TREF) analysis is done using a Crystallization Elution Fractionation (CEF) instrument from Polymer Char, S.A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. In particular, a process conforming to the "TREF separation process" shown in FIG. 1a of this article, in which Fc=0, was used. Pertinent details of the analysis method and features of the apparatus used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-µm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 µm), which is back-flushed after every filtration. The filtrate was then used to completely fill a 200-µl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index (g'vis) are determined by using a high temperature Gel Permeation Chromatography (Polymer Char GPC-IR)

equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80-µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (1), using the following equation: c=/βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1} \log M_{PS},$$

where the variables with subscript "PS" stand for polystyrene while those without a subscript are for the test samples. In this method, $\alpha_{PS}=0.67$ and $K_{PS}=0.000175$ while a and K are for other materials as calculated and published in literature (Sun, T. et al. *Macromolecules* 2001, 34, 6812), except that for purposes of the present disclosure, $\alpha=0.695$ and K=0.000579 for linear ethylene polymers, $\alpha=0.705$ and K=0.0002288 for linear propylene polymers, $\alpha=0.695$ and K=0.000181 for linear butene polymers, $\alpha$ is 0.695 and K is 0.000579*(1−0.0087*w2b+0.000018*(w2b)^2) for ethylenebutene copolymer where w2b is a bulk weight percent of butene comonomer, $\alpha$ is 0.695 and K is 0.000579*(1−0.0075*w2b) for ethylene hexene copolymer where w2b is a bulk weight percent of hexene comonomer, and $\alpha$ is 0.695 and K is 0.000579*(1−0.0077*w2b) for ethyleneoctene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

w2=*f*\*SCB/1000TC.

The bulk composition of the polymer from the GPC-IR and GPC-4D analyses is obtained by considering the entire signals of the $CH_3$ and $CH_2$ channels between the integration limits of the concentration chromatogram. First, the following ratio is obtained:

$$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3 end/1000TC) is obtained by weight-averaging the chain-end correction over the molecular-weight range. Then w2b=*f*\*bulk CH3/1000TC bulk SCB/1000TC=bulk CH3/1000TC bulk CH3end/1000TC and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i[\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and $\alpha$ are for the reference linear polymer, which are, for purposes of the present disclosure, $\alpha=0.695$ and K=0.000579 for linear ethylene polymers, $\alpha=0.705$ and K=0.0002288 for linear propylene polymers, $\alpha=0.695$ and K=0.000181 for linear butene polymers, $\alpha$ is 0.695 and K is $0.000579*(1-0.0087*w2b+0.000018*(w2b)^2)$ for ethylenebutene copolymer where w2b is a bulk weight percent of butene comonomer, $\alpha$ is 0.695 and K is $0.000579*(1-0.0075*w2b)$ for ethylenehexene copolymer where w2b is a bulk weight percent of hexene comonomer, and $\alpha$ is 0.695 and K is $0.000579*(1-0.0077*w2b)$ for ethyleneoctene copolymer where w2b is a bulk weight percent of octene comonomer. Concentrations are expressed in g/cm$^3$, molecular weight is expressed in g/mole, and intrinsic viscosity (hence K in the Mark Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.)

$$x2 = -\frac{200\ w2}{-100\ n - 2\ w2 + n\ w2}.$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W'dz,$$

and a modified weight-average molecular weight ($M_w'$) is calculated over the effectively reduced range of molecular weights as follows:

$$M_w' = \int_{-\infty}^{\infty} 10^z * W'dz.$$

The RCI,m is then computed as $$RCI,m = \int_{-\infty}^{\infty} x2(10^z - M_w')W'dz.$$

A reversed-co-monomer index (RCI,w) is also defined on the basis of the weight fraction co-monomer signal (w2/100) and is computed as follows:

$$RCI, w = \int_{-28}^{\infty} \frac{w2}{100}(10^z - M_w')W'dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

An "in-situ polymer composition" (also referred to as an "in-situ blend" or a "reactor blend") is the composition which is the product of a polymerization with two catalysts in the same reactor described herein. Without being bound by theory, it is thought that the two catalysts produce a reactor blend (i.e., an interpenetrating network) of two (or more) components made in the same reactors (or reactions zones) with the two catalysts. These sorts of compositions may be referred to as reactor blends, although the term may not be strictly accurate since there may be polymer species including components produced by each catalyst that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected after exiting their respective synthesis processes, and then combined to form the blend; whereas for an in-situ polymer composition, the polymer components are prepared within a common synthesis process and the combination is collected exiting the synthesis process.

In any embodiment described herein, the polymer composition produced is an in-situ polymer composition.

In at least one embodiment of the present disclosure, the polymer produced is an in-situ polymer composition having an ethylene content of 70 wt % or more, preferably 80 wt % or more, preferably 90 wt % or more and/or a density of 0.910 or more, alternatively 0.93 g/cc or more; alternatively 0.935 g/cc or more, alternatively 0.938 g/cc or more.

In at least one embodiment of the present disclosure, the polymer produced is an in-situ polymer composition having a density of 0.890 g/cc or more, alternatively from 0.935 to 0.960 g/cc.

In at least one embodiment of the present disclosure, the polymer produced by the processes described herein includes ethylene and one or more comonomers and the polymer has: 1) an RCI,m greater than 30 (alternatively greater than 30 to 50), an Mw/Mn of greater than 1, such as from 1 to 15, or 2.3 to 15, or 3 to 15, and optionally a $T_{75}$–$T_{25}$ of 15 to 20° C.; or 2) an RCI,m greater than 50 (alternatively greater than 80), an Mw/Mn of greater than 5 (alternatively from 5 to 10), and optionally a $T_{75}$–$T_{25}$ of 25 to 45° C.

End Uses

The multi-modal polyolefin produced by the processes disclosed herein and blends thereof are useful in such forming operations as sheet and fiber extrusion and co-extrusion as well as blow molding, injection molding, and rotary molding. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

The polyolefin produced by the processes disclosed herein and blends thereof are useful in film applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Blends

The polymers produced herein may be further blended with additional ethylene polymers (referred to as "second ethylene polymers" or "second ethylene copolymers") and used in molded part and other typical polyethylene applications.

In one aspect of the present disclosure, the second ethylene polymer is selected from ethylene homopolymer, ethylene copolymers, and blends thereof. Useful second ethylene copolymers can include one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the second ethylene polymers are made by the catalysts, activators and processes described in U.S. Pat. Nos. 6,342,566; 6,384,142; 5,741,563; PCT Publication Nos. WO 03/040201; and WO 97/19991. Such catalysts are well known in the art, and are described in, for example, ZIEGLER CATALYSTS (Gerhard Fink, Rolf Millhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

Experimental

Test Methods $^1$H NMR $^1$H NMR data was collected at 120° C. using a 10 mm CryoProbe with a Bruker spectrometer at a $^1$H frequency of 400 MHz (available from Bruker Corporation, United Kingdom). Data were recorded using a maximum pulse width of 45°, 5 seconds between pulses and signal averaging 512 transients. Samples were prepared by dissolving 80 mg of sample in 3 mL of solvent heated at 140° C. Peak assignments are determined referencing the solvent of tetrachloroethane-1,2 D$_2$ at 5.98 ppm.

GPC 4D Procedure

Unless otherwise indicated, the distributions and the moments of molecular weight (Mw, Mn, Mz, Mw/Mn, etc.), the comonomer content (C$_2$, C$_3$, C$_6$, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{\alpha+1} + \frac{\alpha_{PS}+1}{\alpha+1}\log M_{PS},$$

where the variables with subscript "PS" stand for polystyrene while those without a subscript are for the test samples. In this method, $\alpha_{PS}$=0.67 and $K_{PS}$=0.000175, while a and K for other materials are as calculated and published in literature (Sun, T. et al. *Macromolecules* 2001, 34, 6812), except that for purposes of the present disclosure, $\alpha$=0.695 and K=0.000579 for linear ethylene polymers, $\alpha$=0.705 and K=0.0002288 for linear propylene polymers, $\alpha$=0.695 and K=0.000181 for linear butene polymers, $\alpha$ is 0.695 and K is 0.000579*(1−0.0087*w2b+0.000018*(w2b)^2) for ethylenebutene copolymer where w2b is a bulk weight percent of butene comonomer, $\alpha$ is 0.695 and K is 0.000579*(1−0.0075*w2b) for ethylene hexene copolymer where w2b is a bulk weight percent of hexene comonomer, and $\alpha$ is 0.695 and K is 0.000579*(1−0.0077*w2b) for ethyleneoctene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal values are predetermined by NMR or FTIR. In particular, this provides the methyls per 1000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C$_3$, C$_4$, C$_6$, C$_8$, and so on co-monomers, respectively:

$$w2=f*SCB/1000TC.$$

The bulk composition of the polymer from the GPC-IR and GPC-4D analyses is obtained by considering the entire signals of the CH$_3$ and CH$_2$ channels between the integration limits of the concentration chromatogram. First, the following ratio is obtained $$\text{Bulk IR ratio} = \frac{\text{Area of CH}_3 \text{ signal within integration limits}}{\text{Area of CH}_2 \text{ signal within integration limits}}.$$

Then the same calibration of the CH$_3$ and CH$_2$ signal ratio, as mentioned previously in obtaining the CH$_{3/1000}$TC as a function of molecular weight, is applied to obtain the bulk CH$_3$/1000TC. A bulk methyl chain ends per 1000TC (bulk CH$_3$ end/1000TC) is obtained by weight-averaging the chain-end correction over the molecular-weight range. Then $$w2b=f*\text{bulk CH3/1000TC}$$

$$\text{bulk SCB/1000TC=bulk CH3/1000TC bulk CH3end/1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as $$g'_{vis} = \frac{[\eta]_{avg}}{K M_v^\alpha},$$

where $M_V$ is the viscosity-average molecular weight based on molecular weights determined by LS analysis and the K and α are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylenebutene copolymer where w2b is a bulk weight percent of butene comonomer, α is 0.695 and K is 0.000579*(1−0.0075*w2b) for ethylenehexene copolymer where w2b is a bulk weight percent of hexene comonomer, and α is 0.695 and K is 0.000579*(1−0.0077*w2b) for ethyleneoctene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc.):

$$x2 = -\frac{200\,w2}{-100\,n - 2\,w2 + n\,w2}.$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz,$$

and a modified weight-average molecular weight ($M_w'$) is calculated over the effectively reduced range of molecular weights as follows:

$$M_w' = \int_{-\infty}^{\infty} 10^z * W' dz.$$

The RCI,m is then computed as $$RCI,m = \int_{-\infty}^{\infty} x2(10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw + Mn}{2}\right)}$$

$$CDR\text{-}3, w = \frac{w2\left(\frac{Mz + Mw}{2}\right)}{w2\left(\frac{Mw + Mn}{2}\right)}$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

All molecular weights are weight average (Mw) unless otherwise noted. All molecular weights are reported in g/mol unless otherwise noted.

Melt index (MI) also referred to as I2, reported in g/10 min, is determined according to ASTM D1238, 190° C., 2.16 kg load.

High load melt index (HLMI) also referred to as I21, reported in g/10 min, is determined according to ASTM D1238, 190° C., 21.6 kg load.

Melt index ratio (MIR) is MI divided by HLMI as determined by ASTM D1238.

Density is determined according to ASTM D 1505.

Bulk Density is determined as follows; the resin is poured via a ⅞" diameter funnel into a fixed volume cylinder of 400 cc; the bulk density is the weight of resin in the cylinder divided by the 400 cc to give a value in g/cc.

| Catalyst Compounds | |
|---|---|
| Catalyst Compound 1 | Catalyst Compound 2 |
| Me$_2$Si((Me$_3$Si)CH$_2$Cp)$_2$HfMe$_2$ | Ph$_2$Si(Me$_3$SiCH$_2$Cp)$_2$HfMe$_2$ |
| Catalyst Compound 3 | Catalyst Compound 4 |
| rac,meso(1-EthInd)$_2$ZrMe$_2$ | meso-O(Me$_2$SiInd)$_2$ZrCl$_2$ |

Experimental

All manipulations were performed in an inert N$_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dimethylsilyl dichloride (Me$_2$SiCl$_2$) and methylmagnesium bromide (3.0 M solution in diethyl ether) were purchased from Sigma-Aldrich. Hafnium tetrachloride (HfCl$_4$) 99+% and (trimethylsilyl)methyl trifluoromethanesulfonate were procured from Strem Chemicals and TCI America, respectively, and used as received. Potassium cyclopentadienide (KCp) was prepared according to the literature procedure. (Stadelhofer, J.; Weidlein, J.; Haaland, A. J. Organomet. Chem. 1975, 84, C1-C4) n-Butyl lithium (2.5 M solution in hexane), iodomethane, indene and methyllithium (1.6 M solution in diethyl ether) were purchased from Sigma-Aldrich. 1-Ethylindene and lithium-1-ethylindene were prepared according to literature methods. The 41 NMR measurements were recorded on a 400 MHz Bruker spectrometer.

Synthesis of Complex 1

Synthesis of (Trimethylsilyl) methylcyclopentadiene, (Me$_3$Si)CH$_2$CpH

A neat (trimethylsilyl)methyl trifluoromethanesulfonate (10.57 g, 44.7 mmol) was dissolved in 150 mL of diethyl ether and cooled to −25° C., to this a solid potassium cyclopentadienide (4.66 g, 44.7 mmol) was slowly added over a period of 5-10 minutes. The resulting mixture was stirred 5 hours at room temperature. Volatiles from the reaction mixture were carefully removed under dynamic vacuum to avoid evaporating the volatile (trimethylsilyl) methylcyclopentadiene, (Me$_3$Si)CH$_2$CpH. The reaction flask (250 mL round bottom flask) and frit with celite were weighted to calculate yield of the product after extraction. The crude materials were extracted into pentane (3×10 mL) and used without any further purification. Based on above mathematical method, the yield is calculated as 5.55 g (81.6%). The $^1$H NMR spectrum was recorded for the crude material to ensure the product formation. $^1$H NMR (400 MHz, C$_6$D$_6$): δ −0.05 (9H, s, Si—CH$_3$), 1.77 (2H, d, J$_{HH}$=1.2 Hz, Me$_3$Si—CH$_2$), 2.83 (1H, sex, J$_{HH}$=1.5 Hz, Cp-CH), 5.80-6.49 (4H, m, Cp-CH) ppm.

Synthesis of Lithium (trimethylsilyl) methylcyclopentadienide, (Me$_3$Si)CH$_2$CpLi A hexane solution of n-butyl lithium (14.6 mL, 36.5 mmol) was added drop-wise to a precooled solution (pentane and diethyl ether, 50/50 mL) of (Me$_3$Si)CH$_2$CpH (5.55 g, 36.5 mmol) over a period of 15-20 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of (Me$_3$Si)CH$_2$CpLi in 5.75 g (99.7%) yield. $^1$H NMR (400 MHz, THF-d$_8$): δ −0.09 (9H, s, Si—CH$_3$), 1.84 (2H, s, Me$_3$Si—CH$_2$), 5.36 (2H, t, J$_{HH}$=2.6 Hz, Cp-H), 5.47 (2H, t, J$_{HH}$=2.6 Hz, Cp-H) ppm.

Synthesis of Dimethylsilyl-bis((trimethylsilyl) methylcyclopentadiene), Me$_2$Si((Me$_3$Si)CH$_2$CpH)$_2$ A neat Me$_2$SiCl$_2$ (340 mg, 2.6 mmol) was dissolved in 10 mL of THF and cooled to −25° C. A solid lithium (trimethylsilyl) methylcyclopendienide was added to the above mixture and the resulting mixture was stirred overnight at room temperature to ensure completion of the reaction. Volatiles from the reaction mixture were removed in vacuo and subsequently triturated with pentane to remove trace of THF. The crude materials were extracted into pentane and followed by solvent removal under vacuum afforded a thick yellow viscous oil of $Me_2Si((Me_3Si)CH_2CpH)_2$ in 750 mg (80%) yield. $^1H$ NMR (400 MHz, $C_6D_6$): δ −0.15 (6H, bs, $SiMe_2$—$CH_3$), 0.05 (18H, s, $SiMe_3$—$CH_3$), 1.81-1.87 (4H, m, $Me_3Si$—$CH_2$), 3.26 (1H, s, Cp-H), 3.37 (1H, s, Cp-H), 5.99-6.82 (6H, m, Cp-H) ppm.

Synthesis of Lithium dimethylsilyl-bis((trimethylsilyl) methylcyclopentadienide) dimethoxyethane Complex, $Me_2S_4(Me_3SOCH_2Cp)_2Li_2$.dme A hexane solution of n-butyl lithium (1.7 mL, 4.2 mmol, 2.5 M solution) was added drop-wise to a precooled solution of $Me_2Si((Me_3Si)CH_2CpH)_2$ (750 mg, 2.1 mmol) in 10 mL of dimethoxyethane over a period of 5-10 minutes at −25° C. The resulting mixture was gradually warmed to room temperature and then continuously stirred overnight. Volatiles from the reaction mixture were removed in vacuo, and triturated with pentane to remove DME. The crude materials were thoroughly washed with pentane to remove any soluble impurities, and dried under vacuum to give the colorless crystalline solid of $Me_2Si((Me_3Si)CH_2Cp)_2Li_2$.dme in 830 mg (93%) yield. $^1H$ NMR (400 MHz, THF-$d_8$): δ 0.2 (18H, s, $SiMe_3$—$CH_3$), 0.93 (6H, bs, $SiMe_2$—$CH_3$), 2.26 (4H, s, $Me_3Si$—$CH_2$), 2.57 (4H, s, dme-$CH_2$), 2.77 (6H, s, dme-$OCH_3$), 5.94-6.15 (6H, m, Cp-H) ppm.

Synthesis of Rac-meso-dimethylsilyl-bis((trimethylsilyl) methylcyclopentadienide)hafnium dichloride, $Me_2Si((Me_3Si)CH_2Cp)_2HfCl_2$ A solid $HfCl_4$ (570 mg, 1.8 mmol) was added to a precooled diethyl ether (20 mL) solution of Me-2Si $(Me_3SOCH_2Cp)_2Li_2$.dme (830 mg, 1.8 mmol) at −25° C. The resulting mixture was stirred overnight at room temperature. Volatiles from the reaction mixture were removed in vacuo, and then extracted into dichloromethane. Solvent removal under vacuum gave a yellow crystalline solid of $Me_2Si(Me_3SOCH_2$—$Cp)_2HfCl_2$ in 1.02 g (94%) yield. The $^1H$ NMR spectrum of final material integrated a 1:1 ratio of rac/meso isomers. 41 NMR (400 MHz, $CD_2C_{12}$): δ −0.05 (18H, s, $SiMe_3$—$CH_3$), −0.04 (18H, s, $SiMe_3$—$CH_3$), −0.64 (3H, s, $SiMe_2$—$CH_3$, meso), −0.65 (6H, s, $SiMe_2$—$CH_3$, rac), −0.68 (3H, s, $SiMe_2$—$CH_3$, meso), 2.08-2.18 (8H, m, $Me_3Si$—$CH_2$), 5.14 (2H, t, $J_{HH}$=2.6 Hz, Cp-H), 5.28 (2H, t, $J_{HH}$=2.6 Hz, Cp-H), 5.64 (2H, t, $J_{HH}$=2.7 Hz, Cp-H), 5.77 (2H, t, $J_{HH}$=2.7 Hz, Cp-H), 6.19 (2H, t, $J_{HH}$=2.7 Hz, Cp-H), 6.34 (2H, t, $J_{HH}$=2.7 Hz, Cp-H) ppm.

Synthesis of Rac-meso-dimethylsilyl-bis((trimethylsilyl) methylcyclopentadienide)hafnium dimethyl, $Me_2Si((Me_3Si)CH_2Cp)_2HfMe_2$ An ethereal solution of MeMgBr (1.12 mL, 3.34 mmol) was added drop wise to a precooled diethyl ether solution of $Me_2Si(Me_3SOCH_2$—$Cp)_2HfCl_2$ (1.01 g, 1.65 mmol) over a period of 3-5 minutes at −25° C. The resulting mixture was stirred overnight at room temperature to ensure completion of the reaction. Insoluble materials were filtered through a pad of celite. Volatiles from the filtrate were removed under vacuum, and then the crude materials were extracted into pentane. Solvent removal in vacuo afforded a sticky yellow material of $Me_2Si((Me_3Si)CH_2$—$Cp)_2HfMe_2$ in 660 g (71%) yield. The $^1H$ NMR spectrum of final material integrated a 1:1 ratio of rac/meso isomers. $^1H$ NMR (400 MHz, $C_6D_6$): δ −0.25 (3H, s, Hf—$CH_3$, meso), δ −0.24 (6H, s, Hf—$CH_3$, rac), δ −0.20 (3H, s, Hf—$CH_3$, meso), 0.03 (18H, s, $SiMe_3$—$CH_3$), 0.04 (18H, s, $SiMe_3$—$CH_3$), 0.19 (3H, s, $SiMe_2$—$CH_3$, meso), 0.20 (6H, s, $SiMe_2$—$CH_3$, rac), 0.22 (3H, s, $SiMe_2$—$CH_3$, meso), 2.06 (4H, s, $Me_3Si$—$CH_2$, rac), 2.09 (4H, d, $J_{HH}$=3.1 Hz, $Me_3Si$—$CH_2$, meso), 5.03 (2H, t, $J_{HH}$=2.2 Hz, Cp-H), 5.10 (2H, t, $J_{HH}$=2.2 Hz, Cp-H), 5.34 (2H, t, $J_{HH}$=2.6 Hz, Cp-H), 5.44 (2H, t, $J_{HH}$=2.6 Hz, Cp-H), 6.26 (2H, t, $J_{HH}$=2.6 Hz, Cp-H), 6.31 (2H, t, $J_{HH}$=2.6 Hz, Cp-H) ppm.

Synthesis of Complex 2

Synthesis of Diphenylsilyl-bis(trifluoromethanesulfonate), $Ph_2Si(OTf)_2$

A neat $Ph_2SiCl_2$ (1.0 g, 4.0 mmol) was dissolved in 100 mL of DCM and cooled to −25° C., and to this a solid silver trifluoromethanesulfonate (2.1 g, 4.0 mmol) was added over a period of 2-3 minutes. The resulting mixture was covered with aluminum foil and stirred overnight at room temperature. Insoluble byproduct AgCl was filtered out and volatiles from the filtrate were removed in vacuo to afford a colorless crystalline solid of $Ph_2Si(OTf)_2$ in 1.9 g (98.0%) yield. $^1H$ NMR (400 MHz, $CD_2C_{12}$): δ 7.50-7.55 (4H, m, Ar—CH), 7.65-7.70 (2H, m, Ar—CH), 7.73-7.75 (4H, m, Ar—CH) ppm.

Synthesis of Diphenylsilyl-bis-(trimethylsilyl methylcyclopentadiene), $Ph_2Si(Me_3SiCH_2CpH)_2$

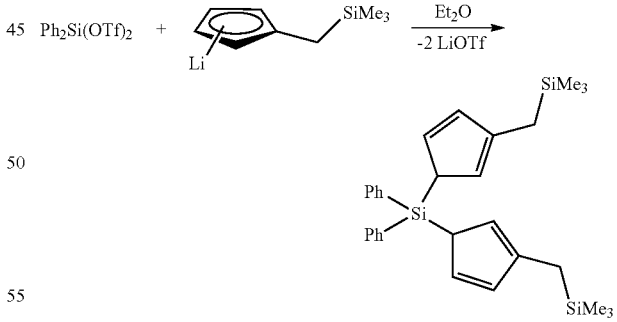

A solid $Ph_2Si(OTf)_2$ (900 mg, 1.8 mmol) was slurried in 15 mL of diethyl ether and cooled to −25° C., and to this a solid $Me_3SiCH_2CpLi$ (580 mg, 3.6 mmol) was added over a period of 3-5 minutes. The resulting mixture was stirred overnight at room temperature to ensure completion of the reaction. All volatiles from the reaction mixture were removed in vacuo and triturated with hexane. The crude materials were then extracted into hexane and followed by solvent removal afforded a pale yellow oil of $Ph_2Si((Me_3Si)CH_2CpH)_2$ in 870 mg (99.6%) yield. $^1H$ NMR (400 MHz, $C_6D_6$): δ 0.01-0.06 (18H, m, $SiMe_3$—$CH_3$), 1.79-1.88 (4H, m, $Me_3Si$—$CH_2$), 3.92 (1H, bs, Cp-CH), 4.06 (1H, bs, Cp-CH), 6.13-6.92 (6H, m, Cp-CH), 7.24-7.30 (6H, m, Ar—CH), 7.71-7.80 (4H, m, Ar—CH) ppm.

Synthesis of Lithium diphenylsilyl-bis-(trimethylsilyl methylcyclopentadienide), $Ph_2Si(Me_3SiCH_2Cp)_2Li_2$

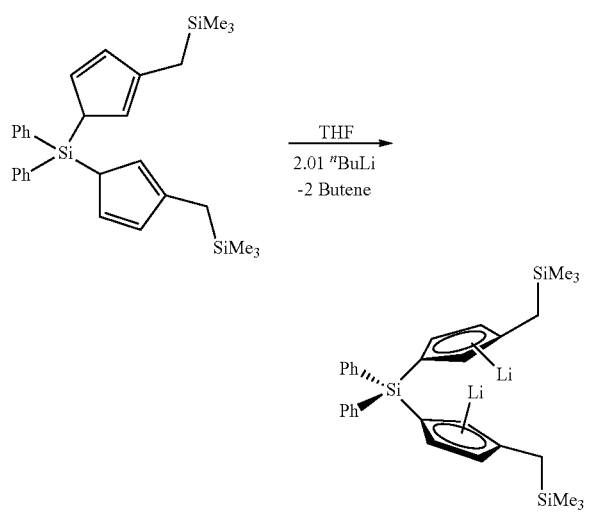

A neat $Ph_2Si(Me_3SiCH_2CpH)_2$ (870 mg, 1.8 mmol) was dissolved in 15 mL of THF and cooled to −25° C., and to this a hexane solution of n-butyl lithium (1.5 mL, 3.62 mmol, 2.5 M solution in diethyl ether) was added over a period of 3-5 minutes. The resulting mixture was gradually warmed to room temperature and continuously stirred overnight. All volatiles from the reaction mixture were removed in vacuo, and triturated with hexane. The crude materials were thoroughly washed with hexane to remove soluble impurities, and dried under vacuum to give an off-white solid of $Ph_2Si(Me_3SiCH_2Cp)_2Li_2$ in 890 mg (99.5%) yield. $^1$H NMR (400 MHz, THF-d$_8$): δ 0.13 (18H, s, $SiMe_3$—$CH_3$), 2.92 (4H, m, $Me_3Si$—$CH_2$), 5.57-6.80 (6H, m, Cp-CH), 7.29 (6H, bs, Ar—CH), 7.98 (4H, bs, Ar—CH) ppm.

Synthesis of Rac-meso-diphenylsilyl-bis-(trimethylsilyl methylcyclopentadienyl)hafnium dichloride, $Ph_2Si(Me_3SiCH_2Cp)_2HfCl_2$ A solid $HfCl_4$ (573 mg, 1.8 mmol) was slurried in 15 mL of diethyl ether and cooled to −25° C., and to this a solid $Ph_2Si(Me_3SiCH_2Cp)_2Li_2$ (890 mg, 1.8 mmol) was added. The resulting mixture was stirred overnight at room temperature. Insoluble materials were removed by filtration and volatiles from the filtrate were removed in vacuo to afford a pale yellow greasy material of $Ph_2Si(Me_3SiCH_2Cp)_2HfCl_2$ in 1.18 g (89.5%) yield. 41 NMR (400 MHz, $CD_2Cl_2$): δ 0.01 (9H, s, $SiMe_3$—$CH_3$), 0.02 (9H, s, $SiMe_3$—$CH_3$), 2.07-2.24 (4H, m, $Me_3Si$—$CH_2$), 5.25 (1H, t, $J_{HH}$=2.4 Hz, Cp-CH), 5.42 (1H, t, $J_{HH}$=2.4 Hz, Cp-CH), 5.78 (1H, t, $J_{HH}$=2.4 Hz, Cp-CH), 5.94 (1H, t, $J_{HH}$=2.4 Hz, Cp-CH), 6.29 (1H, t, $J_{HH}$=2.4 Hz, Cp-CH), 6.44 (1H, t, $J_{HH}$=2.4 Hz, Cp-CH), 7.48-7.55 (6H, m, Ar—CH), 7.90-7.98 (4H, m, Ar—CH) ppm.

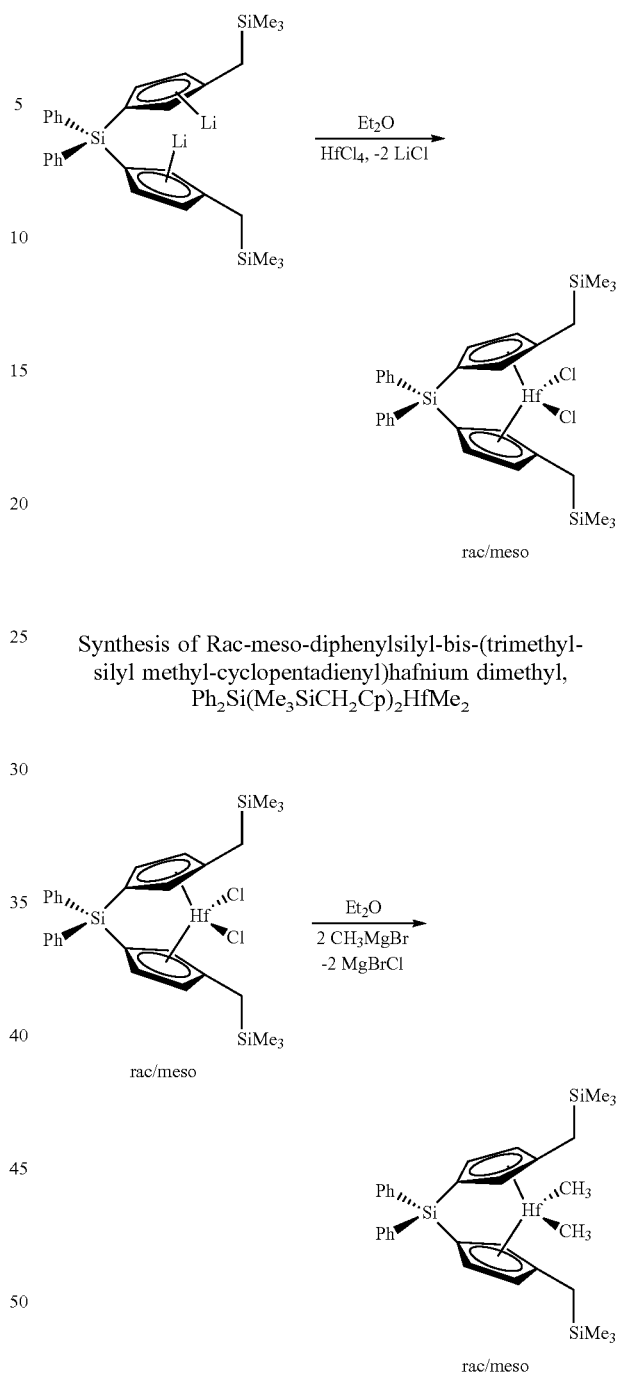

Synthesis of Rac-meso-diphenylsilyl-bis-(trimethylsilyl methyl-cyclopentadienyl)hafnium dimethyl, $Ph_2Si(Me_3SiCH_2Cp)_2HfMe_2$ A neat $Ph_2Si(Me_3SiCH_2Cp)_2HfCl_2$ (1.18 g, 1.6 mmol) was dissolved in 20 mL of diethyl ether and cooled to −25° C., and to this an ethereal solution of MeMgBr (1.1 mL, 3.26 mmol) was added over a period of 3-5 minutes. The resulting mixture was gradually warmed to room temperature and continuously stirred 2 hours. Volatiles were removed under reduced pressure and triturated with hexane. The crude materials were then extracted into hexane and solvent removal afforded a pale thick viscous oil of $Ph_2Si(Me_3SiCH_2Cp)_2HfMe_2$ in 720 mg (79.3%) yield. The $^1$H NMR spectrum of purified compound integrated a 1:1 ratio of rac/meso isomers. 41 NMR (400 MHz, $C_6D_6$): δ −0.26 (3H, s, Hf—$CH_3$, meso), −0.25 (6H, s, Hf—$CH_3$, rac), −0.22

(3H, s, Hf—CH$_3$, meso), 0.05 (18H, s, SiMe$_3$—CH$_3$), 0.06 (18H, s, SiMe$_3$—CH$_3$), 1.97-2.10 (4H, m, Me$_3$Si—CH$_2$), 5.24 (2H, t, J$_{HH}$=2.2 Hz, Cp-CH), 5.33 (2H, t, J$_{HH}$=2.2 Hz, Cp-CH), 5.59 (2H, t, J$_{HH}$=2.6 Hz, Cp-CH), 5.71 (2H, t, J$_{HH}$=2.6 Hz, Cp-CH), 6.23 (2H, dd, J$_{HH}$=2.2 Hz, 2.6 Hz, Cp-CH), 6.34 (2H, dd, J$_{HH}$=2.2 Hz, 2.6 Hz, Cp-CH), 7.16-7.21 (12H, m, Ar—CH), 7.84-7.95 (8H, m, Ar—CH) ppm.

Synthesis of Complex 3 rac,meso(1-EthInd)$_2$ZrMe$_2$

Synthesis of Rac-meso-bis(1-Ethyl-indenyl)zirconium dimethyl, (1-EtInd)$_2$ZrMe$_2$ In a 500 mL round bottom flask, a solid ZrCl$_4$ (9.42 g, 40.4 mmol) was slurried with 250 mL of dimethoxyethane (DME) and cooled to −25° C. A solid lithium-1-ethyl-indenyl (12.13 g, 80.8 mmol) was added over a period of 5-10 minutes, and then the reaction mixture was gradually warmed to room temperature. The resulting orange-yellow mixture was heated at 80° C. for 1 hour to ensure the formation of bis(1-ethyl-indenyl)zirconium dichloride. The mixture was clear at first and then byproduct (LiCl) was precipitated out over a course of reaction, revealing the product formation. Without further purification, the reaction mixture of bis(1-ethyl-indenyl)zirconium dichloride was cooled to −25° C., and to this an ethereal solution of methylmagnesium bromide (27.0 mL, 80.8 mmol, 3.0 M solution in diethyl ether) was added over a period of 10-15 minutes. The resulting mixture was slowly turned to pale yellow and then maroon over a course of reaction and continuously stirred overnight at room temperature. Volatiles were removed in vacuo. The crude materials were then extracted with hexane (50 mL×5), and subsequent solvent removal afforded to the formation of (1-EtInd)$_2$ZrMe$_2$ as an off-white solid in 13.0 g (78.9%) yield. The $^1$H NMR spectrum of final material integrated a 1:1 ratio of rac/meso isomers. $^1$H NMR (400 MHz, C$_6$D$_6$): δ −1.38 (3H, s, Zr—CH$_3$, meso), −0.88 (6H, s, Zr—CH$_3$, rac), −0.30 (3H, s, Zr—CH$_3$, meso), 1.10-1.04 (12H, m, Et-CH$_3$), 2.41-2.52 (4H, m, Et-CH$_2$), 2.67-2.79 (4H, m, Et-CH$_2$), 5.46-5.52 (8H, m, Ind-CH), 6.90-6.96 (8H, m, Ar—CH), 7.08-7.15 (4H, m, Ar—CH), 7.28-7.22 (4H, m, Ar—CH) ppm.

Synthesis of Complex 4 meso-O(Me$_2$SiInd)$_2$ZrCl$_2$ 4 meso-O(Me$_2$SiInd)$_2$ZrCl$_2$ prepared as described in U.S. Pat. No. 7,060,765.
Supported Catalysts
SMAO-ES70-875: Methylalumoxane treated silica was prepared in a manner similar to the following:

In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES70™ silica (PQ Corporation, Conshohocken, Pa.) that has been calcined at 875° C. (see below) is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected.

ES70™ silica that has been calcined at 875° C. is ES70™ silica that has been calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

A 60.0 g amount of SMAO-ES70-875C was added to a Celestir vessel along with 150 mL toluene. Rac/meso-dimethylsilyl bis(trimethylsilylmethylene-cyclopentadienide)hafnium dimethyl (0.545 g, 0.961 mmol), meso-(Me$_2$Si)$_2$O(Ind)$_2$ZrCl$_2$ (0.125 g, 0.239 mmol), rac,meso-diphenylsilyl bis(trimethylsilylmethylene-cyclopentadienide)hafnium dimethyl (0.664 g, 0.961 mmol), and rac/meso-bis(1-ethylindenyl)zirconium dimethyl (0.098 g, 0.239 mmol) were dissolved in 20 mL toluene and added to the Celestir vessel. After stirring for 3 hours, the slurry was then filtered, washed with 20 mL toluene and several 30 mL portions of hexane. The supported catalyst was then dried under vacuum to obtain 60.5 g of light yellow silica.

C1: Comparative polymer product (C1) was formed using the catalysts shown below in a gas phase pilot plant as described below.

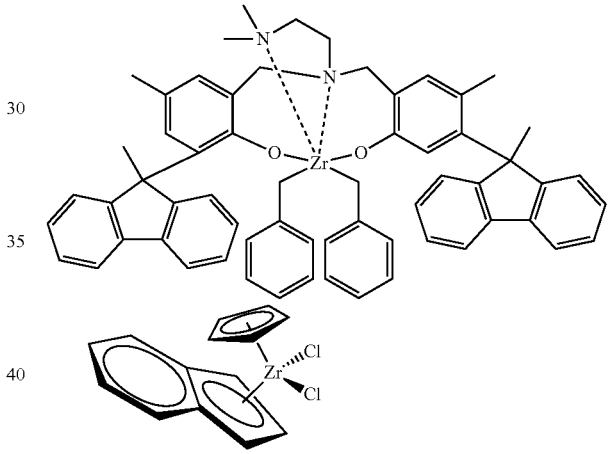

Comparative polymer products (C2-C8) were obtained from commercial sources and used without further modification. The comparative polymer products are as follows:

C2: LL3001 polyethylene is obtained from ExxonMobil Chemical Company (Baytown, Tex.) and is reported to have a density of 0.918 g/cc, a melt index of 1.1 dg/min, and a melt index ratio of 28.

C3: Dowlex™ 2045 is polyethylene obtained from the Dow Chemical Company (Midland, Mich.) and is reported to have a density of 0.920 g/cc, a melt index of 1.0 dg/min, and a melt index ratio of 29.

C4: Exceed™ 1018 is polyethylene obtained from ExxonMobil Chemical Company (Baytown, Tex.) and is reported to have a density of 0.919 g/cc, a melt index of 1.0 dg/min, and a melt index ratio of 16.

C5: Enable™ 2010 is polyethylene obtained from ExxonMobil Chemical Company (Baytown, Tex.) and is reported to have a density of 0.920 g/cc, a melt index of 1.1 dg/min, and a melt index ratio of 34.

C6: Borstar™ FB2230 is polyethylene obtained from Borealis AG (Austria) and is reported to have a density of 0.923 g/cc, a melt index of 0.2 dg/min, and a melt index ratio of 110.

C7: Evolue™ 3010 is polyethylene from Mitsui Chemical Company (Japan) and is reported to have a density of 0.926 g/cc and a melt index of 0.8 dg/min.

C8: Elite™ 5400 is polyethylene obtained from The Dow Chemical Company (Midland, Mich.) and is reported to have a density of 0.918 g/cc, a melt index of 1.1 dg/min, and a melt index ratio of 32.

C9: Polyethylene made in a metallocene gas phase process as described in PCT/US2015/015119 (Polymer 1-10, Table 1) Part 8A having a density of 0.918 g/cc, a melt index of 0.9 dg/min, and a melt index ratio of 28.

Gas Phase Pilot Run for Supported Catalysts

Polymerizations were performed in an 18.5 foot tall gas-phase fluidized bed reactor with a 10 foot body and an 8.5 foot expanded section. Cycle and feed gases were fed into the reactor body through a perforated distributor plate, and the reactor was controlled at 300 psi and 70 mol % ethylene. The reactor temperature was maintained at 185° F. throughout the polymerization by controlling the temperature of the cycle gas loop.

TABLE 1

| | Catalyst #<br>Compound 1:Compound 3:Compound 4:Compound 2 (40:10:40:10) |
|---|---|
| Polymerization Time | 26 hours |
| PROCESS DATA | |
| $H_2$ conc. (molppm) | 321 |
| Hydrogen flow (sccm) | 18.01 |
| C6/C2 Ratio (mol %/mol %) | 0.021 |
| Comonomer conc. (mol %) | 1.44 |
| C2 conc. (mol %) | 69.6 |
| Comonomer/C2 Flow Ratio | 0.076 |
| C2 flow (g/hr) | 1945 |
| H2/C2 Ratio | 4.6 |
| Rx. Pressure (psig) | 300 |
| Reactor Temp (F.) | 185 |
| Avg. Bedweight (g) | 2382 |
| Production (g/hr) | 575 |
| Residence Time (hr) | 4.1 |
| C2 Utilization (gC2/gC2 poly) | 3.38 |
| Avg Velocity (ft/s) | 1.59 |
| Catalyst Slurry Feed (ml/hr) | 3.0 |
| Catalyst Slurry Conc. (wt frac.) | 0.1 |
| Catalyst Slurry Density (g/ml) | 0.88 |
| Trim Feed (ml/hr) | 0.00 |
| Catalyst Feed (g/hr) | 0.267 |
| Cat Activity (g poly/g cat) | 2153 |
| Product Data | |
| Melt Index (MI, dg/min) | 0.92 |
| High Load Melt Index (HLMI, dg/min) | 32.24 |
| HLMI/MI Ratio | 35 |
| Density (g/c) | 0.918 |
| Bulk Density (g/cc)) | 0.3877 |
| Mw/Mn | 6.8 |
| Mz/Mw | 3.18 |
| Mz/Mn | 21.6 |
| Mw (g/mol) | 123879 |
| Mn (g/mol) | 18215 |
| Mz (g/mol) | 394173 |
| g'vis | 0.945 |
| Mw1 | 214,886 |
| Mw2 | 94,671 |
| Mw1/Mw2 | 2.27 |
| Tw1 (° C.) | 51.1 |
| Tw2 (° C.) | 90.8 |
| Tw1 − Tw2 (° C.) | −39.7 |
| (Log(Mw1/Mw2))/(Tw1 − Tw2) | −0.0090 |

The supported system displayed good activity and 26 lbs of PE resin were obtained for film analysis.

Cross-Fractionation Chromatography (CFC)

Cross-fractionation chromatography (CFC), which combines TREF and traditional GPC (TREF/GPC) as disclosed in WO 2015/123164 A1, was performed on a CFC-2 instrument from Polymer Char, Valencia, Spain on the bimodal polypropylenes generated as described above in Table 1. The instrument was operated and subsequent data processing, for example, smoothing parameters, setting baselines, and defining integration limits, was performed according to the manner described in the CFC User Manual provided with the instrument or in a manner commonly used in the art. The instrument was equipped with a TREF column (stainless steel; o.d., ⅜"; length, 15 cm; packing, non-porous stainless steel micro-balls) in the first dimension and a GPC column set (3× PLgel 10 µm Mixed B column from Polymer Labs, UK) in the second dimension. Downstream from the GPC column was an infrared detector (IR4 from Polymer Char) capable of generating an absorbance signal that is proportional to the concentration of polymer in solution.

The sample to be analyzed was dissolved in ortho-dichlorobenzene, at a concentration of about 5 mg/ml, by stirring at 150° C. for 75 min. Then a 0.5 ml volume of the solution containing 2.5 mg of polymer was loaded in the center of the TREF column and the column temperature was reduced and stabilized at about 120° C. for 30 min. The column was then cooled slowly (0.2° C./min) to 30° C. (for ambient runs) or −15° C. (for cryogenic runs) to crystallize the polymer on the inert support. The low temperature was held for 10 min before injecting the soluble fraction into the GPC column. All GPC analyses were done using solvent ortho-dichlorobenzene at 1 ml/min, a column temperature of 140° C., and in the "Overlap GPC Injections" mode. Then the subsequent higher-temperature fractions were analyzed by increasing the TREF column temperature to the fraction set-points in a stepwise manner, letting the polymer dissolve for 16 min ("Analysis Time"), and injecting the dissolved polymer into the GPC column for 3 min ("Elution Time"). The soluble portion or "purge" of the polymers was not analyzed, only the "insoluble" portion of the polymer samples were analyzed, that is, insoluble at −15° C. or lower.

The universal calibration method was used for determining the molecular mass of eluting polymers. Thirteen narrow molecular-weight distribution polystyrene standards (obtained from Polymer Labs, UK) within a range of 1.5 to 8,200 Kg/mol were used to generate a universal calibration curve. Mark-Houwink parameters were obtained from Appendix I of *Size Exclusion Chromatography* by S. Mori and H. G. Barth (Springer, 1999). For polystyrene K=1.38× $10^{-4}$ dl/g and α=0.7; and for polyethylene K=5.05×$10^4$ dl/g and α=0.693 were used. Fractions having a weight % recovery (as reported by the instrument software) of less than 0.5% were not processed for calculations of molecular-weight averages (Mn, Mw, etc.) of the individual fractions or of aggregates of fractions.

A GPC-4D spectrum of the PE resin was obtained for the resin produced above and is depicted in FIG. 1.

Measuring $Tw_1$, $Tw_2$, $Mw_1$ and $M_w2$ from CFC

Cryogenic cross-fractionation (CFC) was used here for determining both molecular weight distribution (MWD) and the short-chain branching distribution (SCBD) compositional information, which utilizes one or more temperature-gradient gel permeation chromatographic columns to compare the inventive polymers to other products on the market. The procedures for interpreting the data obtained from CFC are discussed in more detail below. Among other information, this technique helps to elucidate the level of comonomer on high-to-low molecular weight fractions of polyethylenes.

From the CFC data obtained, each fraction is listed by its fractionation temperature (Ti) along with its normalized weight percent (wt %) value (Wi), cumulative weight percent and various moments of molecular weight averages (including weight average molecular weight, Mwi).

The molecular weight fractions of polyethylenes are then determined by first plotting the elution temperature in centigrade on the x-axis of a graph, while plotting the value of the integral of the weights of polymer that have been eluted up to an elution temperature on the right side y-axis. The closest point at which 50% of the polymer has eluted is determined by the integral, which is used then to divide each of the plots into a $1^{st}$-half and a $2^{nd}$-half.

Qualitatively, a gradient of molecular weight fractions of the polyethylene (a gradient based on both molecular weight of individual polymer chains and the level of branching on each chain) elutes from at least one temperature-gradient gel permeation chromatographic column at a gradient of temperatures, where 50 wt % or less of the cumulative molecular weight polyethylene fractions elutes at a temperature $T_{w1}$, and greater than 50 wt % cumulative molecular weight polyethylene fractions elute at a temperature $T_{w2}$, the molecular weight fractions eluting at $T_{w1}$ being a high molecular weight component $M_{w1}$ and the fractions eluting at $Tw_2$ being a low molecular weight component $Mw_2$.

Quantitatively, to calculate values of $T_{w1}$, $T_{w2}$, $M_{w1}$ and $M_{w2}$, the data obtained from fractional CFC was divided into two roughly equal halves. Weight averages of Ti and Mwi for each half were calculated according to the conventional definition of weight average. Fractions which did not have sufficient quantity (<0.5 wt %) to be processed for molecular weight averages in the original data file were excluded from the calculation of $T_{w1}$, $T_{w2}$, $M_{w1}$ and $M_{w2}$.

From the CFC data, the fraction whose cumulative weight percentage (sum weight) is closest to 50% is identified. The fractional CFC data is divided into two halves, for example, Ti≤84° C. as the $1^{st}$ half and Ti>84° C. as the $2^{nd}$ half. Fractions which do not have molecular weight averages reported in the original data file are excluded. The left hand y-axis represents the weight percent (wt %) of the eluted fraction. Using the procedure above to divide the curves into two halves, these values are used to calculate the weight average elution temperature for each half using the formula shown in Equation (1):

$$Tw = \frac{\sum TiWi}{\sum Wi}. \quad (1)$$

In Equation 1, Ti represents the elution temperature for each eluted fraction and Wi represents the normalized weight % (polymer amount) of each eluted fraction. The left hand axis represents the weight average molecular weight (Mwj) of each eluted fraction. These values are used to calculate the weight average molecular weight for each half using the formula shown in (2):

$$Mw = \frac{\sum MwiWi}{\sum Wi}. \quad (2)$$

In Equation 2, Mw represents the weight average molecular weight of each eluted fraction and Wi represents the normalized weight % (polymer amount) of each eluted fraction. The values calculated using the techniques described above are shown in FIG. 2 and may be used to classify the MWD x SCBD for experimental polymers and control polymers.

Figure 2A:
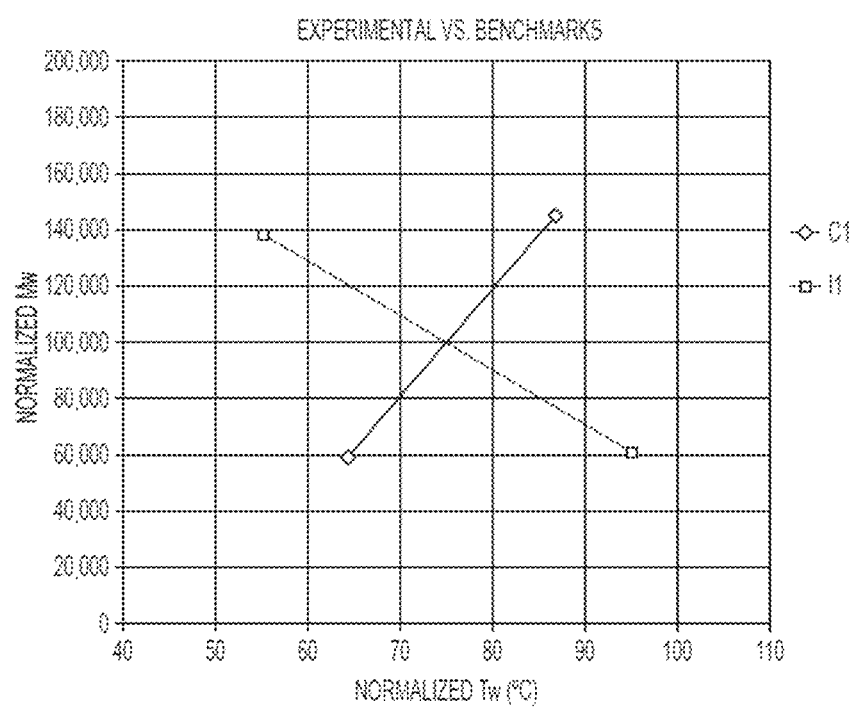
FIG. 2A is a graph illustrating normalized Mw versus normalized Tw (° C.) of a polyethylene resin, according to at least one embodiment.
Figure 2B:
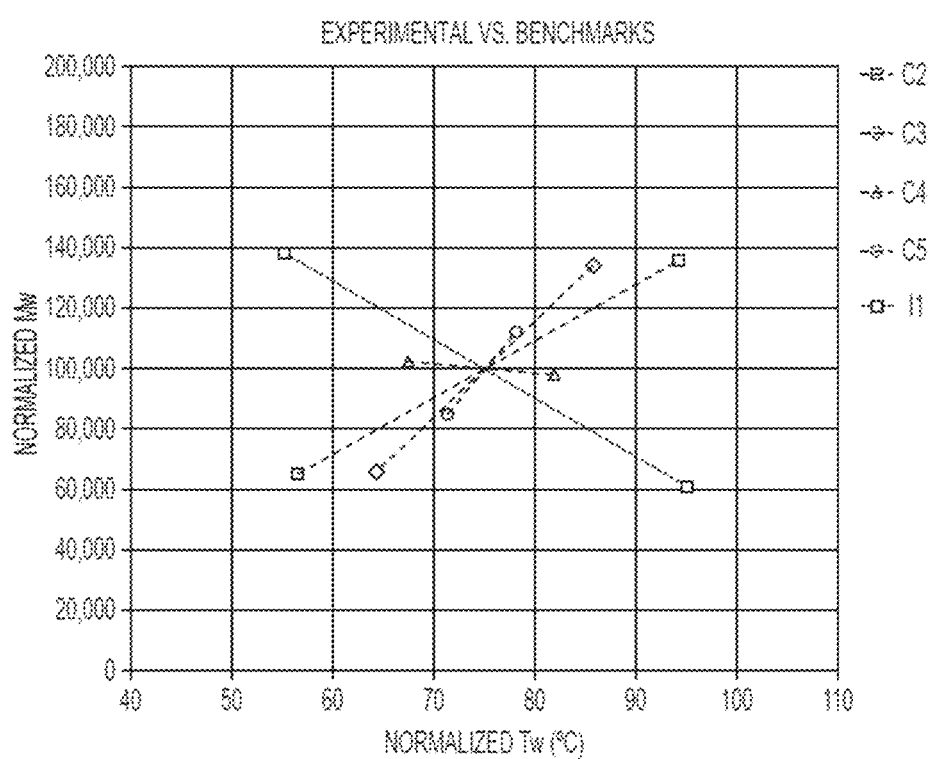
FIG. 2B is a graph illustrating normalized Mw versus normalized Tw (° C.) of a polyethylene resin, according to at least one embodiment.
Figure 2C:
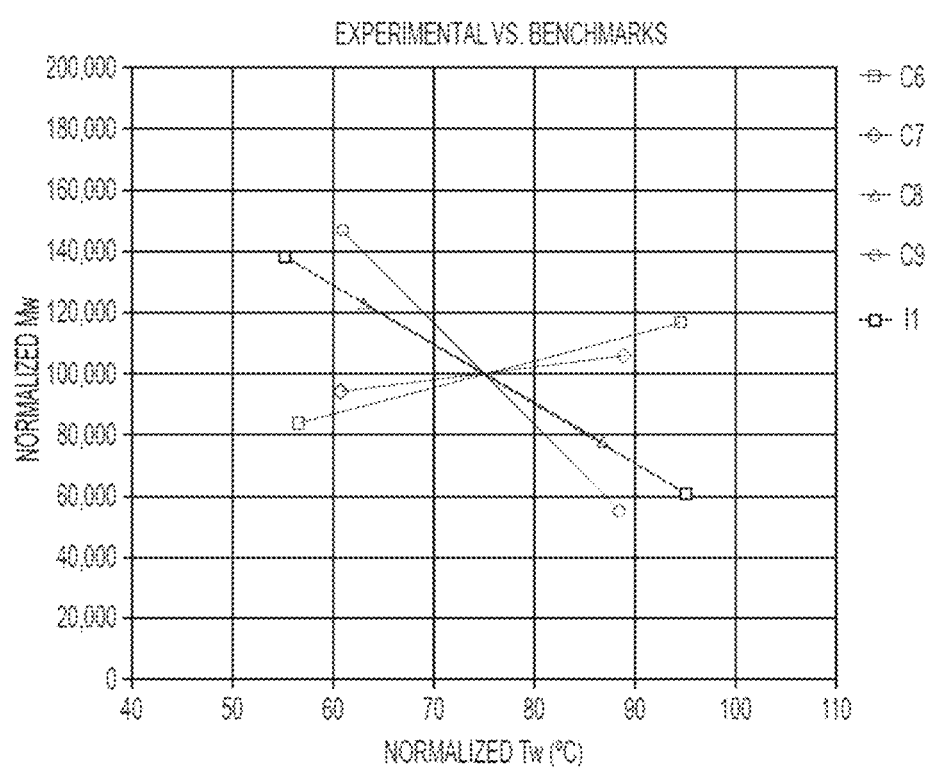
FIG. 2C is a graph illustrating normalized Mw versus normalized Tw (° C.) of a polyethylene resin, according to at least one embodiment.

In the plot in FIG. 2A, FIG. 2B, and FIG. 2C, the x-axis represents the value of the difference between the first and second weight average elution temperatures ($T_{w1}-T_{w2}$) denoted "Normalized $T_w$ (° C.)". The y-axis in a log scale represents the ratio of the first weight average molecular weight to the second weight average molecular weight ($M_{w1}/M_{w2}$) denoted "Normalized $M_w$". A generalization among various types of polymer compositions as expressed in the plot can be described as follows:

Point at X=0/Y=0: An ideal case of absolutely narrow MWD and absolutely narrow SCBD. Practically impossible for X=0 due to the forced division along temperature axis into two halves, as shown in FIG. 2A, FIG. 2B, and FIG. 2C.

Line of X=0: An ideal case of broadening MWD while keeping SCBD absolutely narrow. At X=0, no difference in the direction of moving Y values up or down, that is, broadening MWD while keeping SCBD at absolute narrow.

Line of Y=0: A case of broadening SCBD while keeping MWD unchanged and narrow.

Corner with X<0/Y<1: Products where polymer composition characterized by the combination of Low Mwi/Low Ti (high SCB) molecules with High Mwi/High Ti (low SCB) molecules; exemplified by conventional LLDPE with ZN-catalyst.

Corner with X<0/Y>1: Products where polymer composition characterized by the combination of Low Mwi/High Ti (low SCB) molecules with High Mwi/Low Ti (high SCB) molecules; exemplified by the so-called BOCD (Broad Orthogonal Composition Distribution) or Reversed Composition Distribution products.

FIG. 2A, FIG. 2B, and FIG. 2C illustrate the density splits from a very broad CD for the polymer produced above. The MWD is quite good (e.g., 7.75 PDI for 35 MIR) likely due to high component PDIs.

Overall, catalyst systems of the present disclosure can provide increased activity or enhanced polymer properties, increased conversion or comonomer incorporation, and can alter comonomer distribution. Catalyst systems and processes of the present disclosure can also provide ethylene polymers having the unique properties of high stiffness, high toughness, good processability and improved film properties.

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I"

"preceding the recitation of the composition, element, or elements and vice versa, e.g., the terms "comprising," "consisting essentially of," "consisting of" also include the product of the combinations of elements listed after the term.

We claim:

1. A catalyst system comprising:
at least two different catalysts represented by formula (A):

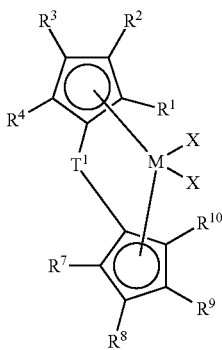

(A)

wherein:
M is Hf or Zr,
each $R^1$, $R^2$, and $R^4$ is independently hydrogen, alkoxide or a $C_1$ to $C_{40}$ substituted or unsubstituted hydrocarbyl group,
$R^3$ is independently hydrogen, alkoxide or a $C_1$ to $C_{40}$ substituted or unsubstituted hydrocarbyl group or is $CH_2$—$SiR'_3$ or $CH_2$—$CR'_3$, and each R' is independently a $C_1$ to $C_{20}$ substituted or unsubstituted hydrocarbyl,
each $R^7$, $R^8$, $R^9$ and $R^{10}$ is independently hydrogen, alkoxide, a $C_1$ to $C_{40}$ substituted or unsubstituted hydrocarbyl group, —$CH_2$—$SiR'_3$, or —$CH_2$—$CR'_3$, and each R' is independently a $C_1$ to $C_{20}$ substituted or unsubstituted hydrocarbyl, wherein at least one of $R^7$, $R^8$, $R^9$ and $R^{10}$ is —$CH_2$—$SiR'_3$ or —$CH_2$—$CR'_3$,
$T^1$ is a bridging group, and
each X is independently a univalent anionic ligand, or two Xs are joined and bound to the metal atom to form a metallocyclic ring, or two Xs are joined to form a chelating ligand, a diene ligand, or an alkylidene ligand;
at least two different catalysts represented by formula (B):

(B)

wherein:
each Cp is independently a cyclopentadienyl, indenyl or fluorenyl group which is optionally independently substituted or unsubstituted,
$M^1$ is zirconium or hafnium,
$T^2$ is a bridging group,
y is 0 or 1, indicating the absence or presence of T,
X is a halide, a hydride, an alkyl group, an alkenyl group or an arylalkyl group,
m=2 or 3, q=0, 1, 2, or 3, the sum of m+q is equal to the oxidation state of the transition metal, 2, 3, or 4, and
each Cp and X is bound to $M^1$;
a support material; and
an activator.

2. A catalyst system comprising:
at least two different catalysts represented by formula (A):

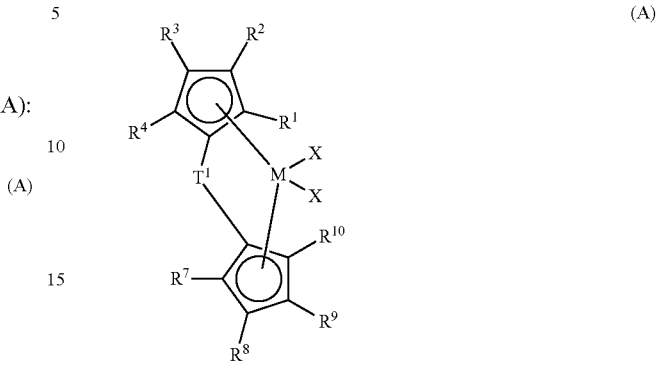

(A)

wherein:
M is Hf or Zr,
each $R^2$, and $R^4$ is independently hydrogen, alkoxide or a $C_1$ to $C_{40}$ substituted or unsubstituted hydrocarbyl group,
$R^3$ is independently hydrogen, alkoxide or a $C_1$ to $C_{40}$ substituted or unsubstituted hydrocarbyl group or is —$CH_2$—$SiR'_3$ or —$CH_2$—$CR'_3$, and each R' is independently a $C_1$ to $C_{20}$ substituted or unsubstituted hydrocarbyl,
each $R^7$, $R^8$, $R^9$ and $R^{10}$ is independently hydrogen, alkoxide, a $C_1$ to $C_{40}$ substituted or unsubstituted hydrocarbyl group, —$CH_2$—$SiR'_3$, or —$CH_2$—$CR'_3$, and each R' is independently a $C_1$ to $C_{20}$ substituted or unsubstituted hydrocarbyl, wherein at least one of $R^7$, $R^8$, $R^9$ and $R^{10}$ is —$CH_2$—$SiR'_3$ or —$CH_2$—$CR'_3$,
$T^1$ is a bridging group, and
each X is independently a univalent anionic ligand, or two Xs are joined and bound to the metal atom to form a metallocyclic ring, or two Xs are joined to form a chelating ligand, a diene ligand, or an alkylidene ligand;
at least one catalyst represented by formula (C) and at least one catalyst represented by formula (D):

(C)

(D)

wherein:
each Cp is independently a cyclopentadienyl, indenyl or fluorenyl group which optionally is independently substituted or unsubstituted,
$M^1$ is zirconium or hafnium,
$M^2$ is zirconium or hafnium,
$T^3$ is a bridging group;
X is a halide, a hydride, an alkyl group, an alkenyl group or an arylalkyl group,
m=2 or 3, q=0, 1, 2, or 3, the sum of m+q is equal to the oxidation state of the transition metal, 2, 3, or 4,
each Cp and X is bound to $M^1$ or $M^2$;
a support material; and
an activator.

3. The catalyst system of claim 1, wherein M is Hf or Zr, each $R^1$, $R^2$, $R^3$, and $R^4$ is a H or a $C_1$ to $C_{20}$ alkyl group and $R^9$ is —$R^{20}$—$SiR''_3$ or —$R^{20}$—$CR''_3$ wherein $R^{20}$ is $CH_2$, and R" is a $C_1$ to $C_{20}$ alkyl or aryl.

4. The catalyst system of claim 2, wherein $M^1$ and $M^2$ are both zirconium.

5. The catalyst system of claim 2, wherein $M^1$ and $M^2$ are both zirconium and wherein $T^3$ is $Si(Me)_2OSi(Me)_2$-, —Si$(Me)_2Si(Me)_2$-, or —$CH_2CH_2$—.

6. The catalyst system of claim 2, wherein $M^1$ and $M^2$ are both zirconium and M is hafnium.

7. The catalyst system of claim 1, wherein M is Hf or Zr, each $R^1$, $R^2$, $R^3$, and $R^4$ is hydrogen or a $C_1$ to $C_{20}$ alkyl group and $R^9$ is —$R^{20}$—$SiR'_3$ or —$R^{20}$—$CR'_3$ where $R^{20}$ is $CH_2$, and R' is a $C_1$ to $C_{20}$ alkyl or aryl and $R^3$ is —$R^{20}$—$SiR'_3$ or —$R^{20}$—$CR'_3$, where $R^{20}$ is $CH_2$, and R' is a $C_1$ to $C_{20}$ alkyl or aryl.

8. The catalyst system of claim 1, wherein $M^1$ in formula B is Zr and Cp is indenyl.

9. The catalyst system of claim 1, wherein each of the catalysts represented by formula (A) is selected from:
rac/meso-$Me_2Si(3-Me_3Si$—$CH_2$-$Cp)_2HfMe_2$; rac-$Me_2Si$(3-$Me_3$ Si—$CH_2$-$Cp)_2HfMe_2$; rac/meso-$Ph_2Si$(3-$Me_3Si$—$CH_2$-$Cp)_2HfMe_2$ rac/meso-PhMeSi(3-$Me_3$ Si—$CH_2$-$Cp)_2HfMe_2$; rac/meso-$(CH_2)_4Si(3-Me_3$ Si—$CH_2$-$Cp)_2HfMe_2$; rac/meso-$(CH_2)_3$ Si(3-$Me_3Si$—$CH_2$-$Cp)_2HfMe_2$; Me(H)Si(3-$Me_3$ Si—$CH_2$-$Cp)_2HfMe_2$; Ph(H)Si(3-$Me_3Si$—$CH_2$-$Cp)_2HfMe_2$; rac/meso-(biphenyl)$_2$Si(3-$Me_3$ Si—$CH_2$-$Cp)_2HfMe_2$; rac/meso-$(F$—$C_6H_4)_2$ Si(3-$Me_3Si$—$CH_2$-$Cp)_2HfMe_2$; rac/meso-$Me_2Ge(3-Me_3$ Si—$CH_2$-$Cp)_2HfMe_2$; rac-$Me_2Ge$(3-$Me_3$ Si—$CH_2$-$Cp)_2HfMe_2$; rac/meso-$Ph_2Ge$(3-$Me_3Si$—$CH_2$-$Cp)_2HfMe_2$; $Me_2Si(Me_4Cp)$(3-$Me_3$ Si—$CH_2$-Cp)$HfMe_2$; $Ph_2Si(Me_4Cp)$(3-$Me_3$ Si—$CH_2$-Cp)$HfMe_2$; $Me_2Ge(Me_4Cp)$(3-$Me_3$ Si—$CH_2$-Cp)$HfMe_2$; $Ph_2Ge(Me_4Cp)$(3-$Me_3Si$—$CH_2$-Cp)$HfMe_2$; $PhMeSi(Me_4Cp)$(3-$Me_3$ Si—$CH_2$-Cp)$HfMe_2$; $(CH_2)_3Si(Me_4Cp)(3-Me_3Si$—$CH_2$-Cp)$HfMe_2$; $(CH_2)_4Si(Me_4Cp)(3-Me_3Si$—$CH_2$-Cp)$HfMe_2$; $Et_2Si(Me_4Cp)(3-Me_3Si$—$CH_2$-Cp)$HfMe_2$; or the versions thereof where $Me_a$ is replaced with $Et_2$, $Cl_2$, $Br_2$, $I_2$, or $Ph_2$.

10. The catalyst system of claim 1, wherein each of the catalysts represented by formula (B) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl) zirconium dichloride, rac/meso-bis(1-methylindenyl) zirconium dimethyl, rac/meso-bis(1-propylindenyl) zirconium dichloride, rac/meso-bis(1-propylindenyl) zirconium dimethyl, rac/meso-bis(1-butylindenyl) zirconium dichloride, rac/meso-bis(1-butylindenyl) zirconium dimethyl, meso-bis(1-ethylindenyl) zirconium dichloride, meso-bis(1-ethylindenyl) zirconium dimethyl, (1-methylindenyl)(pentamethylcyclopentadienyl) zirconium dichloride, and (1-methylindenyl)(pentamethyl cyclopentadienyl) zirconium dimethyl, and dimethylsilyl-bis(indenyl)zirconium dichloride, rac/meso-$(Me_2Si)_2O(Ind)_2ZrCl_2$; meso-$(Me_2Si)_2O(Ind)_2ZrCl_2$; rac/meso-$(Ph_2Si)_2O(Ind)_2ZrCl_2$; rac/meso-$(MePhSi)_2O(Ind)_2ZrCl_2$; rac/meso-$(tBu_2Si$—O—$SiPh_2)O(Ind)_2ZrCl_2$; rac/meso-$(Me_2Si)_2O(1-MeInd)_2ZrCl_2$; rac/meso-$(Ph_2Si)_2O(1-MeInd)_2ZrCl_2$; rac/meso-$(MePhSi)_2O(1-MeInd)_2ZrCl_2$; rac/meso-$(tBu_2Si$—O—$SiPh_2)O(1-MeInd)_2ZrCl_2$; rac/meso-$(Me_2Si)_2O(1-EtInd)_2ZrCl_2$; rac/meso-$(Ph_2Si)_2O(1-EtInd)_2ZrCl_2$; rac/meso-$(MePhSi)_2O(1-EtInd)_2ZrCl_2$; rac/meso-$(tBu_2Si$—O—$SiPh_2)O(1-EtInd)_2ZrCl_2$; rac/meso-$(Me_2Si)_2O(1-PrInd)_2ZrCl_2$; rac/meso-$(Ph_2Si)_2O(1-PrInd)_2ZrCl_2$; rac/meso-$(MePhSi)_2O(1-PrInd)_2ZrCl_2$; rac/meso-$(tBu_2$ Si—O—$SiPh_2)O(1-PrInd)_2ZrCl_2$; rac/meso-$(Me_2Si)_2(Ind)_2ZrCl_2$; rac/meso-$(Ph_2Si)_2(Ind)_2ZrCl_2$; rac/meso-$(MePhSi)_2(Ind)_2ZrCl_2$; rac/meso-$(tBuPhSi)_2(Ind)_2ZrCl_2$; rac/meso-$(NpPhSi)_2(Ind)_2ZrCl_2$; rac/meso-$(Me_2Si)_2(1-MeInd)_2ZrCl_2$; rac/meso-$(Ph_2Si)_2(1-MeInd)_2ZrCl_2$; rac/meso-$(MePhSi)_2(1-MeInd)_2ZrCl_2$; rac/meso-$(tBuPh$ $Si)_2(1-MeInd)_2ZrCl_2$; or rac/meso-$(NpPhSi)_2(1-MeInd)_2ZrCl_2$.

11. The catalyst system of claim 2, wherein each of the catalysts represented by formula (C) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propylcyclopentadienyl)(pentamethyl cyclopentadienyl)zirconium dichloride, (n-propylcyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl) zirconium dichloride, meso-bis(1-ethylindenyl) zirconium dimethyl, (1-methylindenyl)(pentamethylcyclopentadienyl) zirconium dichloride, and (1-methylindenyl)(pentamethyl cyclopentadienyl) zirconium dimethyl, or dimethylsilyl-bis(indenyl)zirconium dichloride.

12. The catalyst system of claim 2, wherein each of the catalysts represented by formula (D) is selected from: rac/meso-$(Me_2Si)_2O(Ind)_2ZrCl_2$; meso-$(Me_2Si)_2O(Ind)_2ZrCl_2$; rac/meso-$(Ph_2Si)_2O(Ind)_2ZrCl_2$; rac/meso-$(MePhSi)_2O$ (Ind)$_2$ZrCl$_2$; rac/meso-(tBu$_2$Si—O—SiPh$_2$)O(Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O(1-PrInd)$_2$ZrCl$_2$; rac/meso-(MePhSi)$_2$O(1-PrInd)$_2$ZrCl$_2$; rac/meso-(tBu$_2$Si—O—SiPh$_2$)O(1-PrInd)$_2$ZrCl$_2$; rac/meso-(Me$_2$Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$(1-MeInd)$_2$ZrCl$_2$; rac/meso-(tBuPhSi)$_2$(1-MeInd)$_2$ZrCl$_2$; or rac/meso-(NpPhSi)$_2$(1-MeInd)$_2$ZrCl$_2$.

13. The catalyst system of claim 1, wherein the support material has a surface area from 10 m$^2$/g to 700 m$^2$/g and an average particle diameter from 10 μm to 500 μm.

14. The catalyst system of claim 1, wherein the support material is selected from the group consisting of silica, alumina, silica-alumina, and combinations thereof.

15. The process of claim 14, wherein the activator comprises alumoxane, and a molar ratio of the alumoxane to the catalyst compound is at least 150.

16. The catalyst system of claim 1, wherein the support material is fluorided or sulfated.

17. The catalyst system of claim 1, wherein the activator comprises alumoxane or a noncoordinating anion.

18. The catalyst system of claim 1, wherein the activator is methylalumoxane.

19. The catalyst system of claim 1, wherein the support is a silica aluminate comprising an electron withdrawing anion.

20. The catalyst system of claim 1, wherein the support is treated with an alkyl aluminum.

21. The catalyst system of claim 19, wherein the support is substantially free of methyl alumoxane and/or a noncoordinating anion.

22. The catalyst system of claim 1, wherein at least one catalyst represented by formula (B) is present in the catalyst system as at least two isomers.

23. The catalyst system of claim 1, wherein the activator comprises one or more of: N,N-dimethylanilinium tetrakis(perfluoronaphthyl)borate, N,N-dimethyl anilinium tetrakis(perfluorobiphenyl)borate, N,N-dimethyl anilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4{}^-$], 1-(4-(tris(pentafluorophenyl)borate)-2,3,5,6-tetrafluorophenyl) pyrrolidinium; [Me$_3$NH$^+$][B(C$_6$F$_5$)$_4{}^-$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, 4-(tris(pentafluorophenyl)borate)-2,3,5,6-tetrafluoropyridinium, sodium tetrakis(perfluorophenyl)aluminate, potassium terakis(pentafluorophenyl), and N,N-dimethylanilinium tetrakis(perfluorophenyl)aluminate.

24. A process for polymerization of olefin monomers comprising contacting one or more olefin monomers with the catalyst system of claim 1.

25. The process of claim 24, wherein the olefin monomers comprise ethylene and the polymerization of the olefin monomers forms linear low density polyethylene.

26. A process for the production of an ethylene alpha-olefin copolymer comprising: polymerizing the ethylene and at least one alpha-olefin by contacting the ethylene and the at least one alpha-olefin with the catalyst system of claim 1 in at least one gas phase reactor at a reactor pressure of from 0.7 to 70 bar and a reactor temperature of from 20° C. to 150° C. to form an ethylene alpha-olefin copolymer.

27. A process for the production of an ethylene alpha-olefin copolymer comprising: polymerizing ethylene and at least one alpha-olefin by contacting the ethylene and at least one alpha-olefin with the catalyst system of claim 1 in at least one gas-phase reactor, where the copolymer has a density of 0.890 g/cc or more, a melt flow index from 0.1 to 80 g/10 min, and a Mw/Mn from 2.5 to 12.5.

28. The process of claim 27, wherein the copolymer has a density from 0.900 to 0.940 g/cc.

29. The process of claim 27, wherein the copolymer has an Mz/Mw of 2 to 3.

30. The process of claim 27, wherein the copolymer has an Mw value of 50,000 to 250,000 g/mol, an Mw/Mn value of 2.5 to 10, a density from 0.900 to 0.940 g/cc, and an Mz/Mw of 2 to 3.

31. A process for the production of an ethylene alpha-olefin copolymer comprising: polymerizing ethylene and at least one alpha-olefin by contacting the ethylene and at least one alpha-olefin with the catalyst system of claim 1 in at least one slurry phase reactor at a reactor pressure of from 0.7 to 70 bar and a reactor temperature of from 60° C. to 130° C. to form an ethylene alpha-olefin copolymer.

32. A process for the production of an ethylene alpha-olefin copolymer comprising: polymerizing ethylene and at least one alpha-olefin by contacting the ethylene and at least one alpha-olefin with the catalyst system of claim 1 in at least one slurry phase reactor wherein the copolymer has a density of 0.890 g/cc or more, a melt flow index from 0.1 to 80 g/10 min, and a Mw/Mn from 2.5 to 12.5.

33. A process for the production of an ethylene alpha-olefin copolymer comprising: polymerizing ethylene and at least one alpha-olefin by contacting the ethylene and at least one alpha-olefin with the catalyst system of claim 1 wherein the ethylene alpha-olefin copolymer comprises
ethylene derived units and from 0.5 to 20 wt % of C$_3$ to C$_{12}$ α-olefin derived units; and has:
an MI from 0.1 to 6 g/10 min;
a density from 0.890 to 0.940 g/cc;
a HLMI from 5 to 40 g/10 min;
a Tw$_1$-Tw$_2$ value greater than −36° C.;
an Mw$_1$/Mw$_2$ value of from 0.9 to 4;
an Mw/Mn between 5 and 10;
an Mz/Mw between 2.5 and 3.5;
an Mz/Mn between 15 and 25; and
a g'$_{(vis)}$ greater than 0.90.

34. A process for the production of an ethylene alpha-olefin copolymer comprising: polymerizing ethylene and at least one alpha-olefin by contacting the ethylene and at least one alpha-olefin with the catalyst system of claim 1 wherein the ethylene alpha-olefin copolymer comprises
ethylene derived units and from 0.5 to 20 wt % of C$_3$ to C$_{12}$ α-olefin derived units; and has:
an MI from 0.1 to 20 g/10 min;
a density from 0.890 to 0.940 g/cc;
a melt index ratio, I21/I2, from 25 to 45 g/10 min;
a Tw$_1$-Tw$_2$ value less than −30° C.;
an Mw$_1$/Mw$_2$ value of from 0.9 to 4;
an Mw/Mn between 5 and 10;
an Mz/Mw between 2.5 and 3.5;
an Mz/Mn between 15 and 25; and
a g'$_{(vis)}$ greater than 0.90.

35. A process for the production of an ethylene alpha-olefin copolymer comprising: polymerizing ethylene and at least one alpha-olefin by contacting the ethylene and at least one alpha-olefin with the catalyst system of claim 1 in at least one gas-phase reactor, where the copolymer has a density of 0.890 g/cc or more, a melt flow index from 0.1 to 80 g/10 min, and a Mw/Mn from 2.5 to 12.5, where in the copolymer is formed into a film.

36. The catalyst system of claim 2, wherein M is Hf or Zr, each $R^1$, $R^2$, $R^3$, and $R^4$ is hydrogen or a $C_1$ to $C_{20}$ alkyl group and $R^9$ is $—R^{20}—SiR'_3$ or $—R^{20}—CR'_3$ where $R^{20}$ is $CH_2$, and R' is a $C_1$ to $C_{20}$ alkyl or aryl and $R^3$ is $—R^{20}—SiR'_3$ or $—R^{20}—CR'_3$ where $R^{20}$ is $CH_2$, and R' is a $C_1$ to $C_{20}$ alkyl or aryl.

37. The catalyst system of claim 2, wherein $M^t$ in formula B is Zr and Cp is indenyl.

38. The catalyst system of claim 2, wherein each of the catalysts represented by formula (A) is selected from:
rac/meso-Me₂Si(3-Me₃Si—CH₂-Cp)₂HfMe₂; rac-Me₂Si(3-Me₃Si—CH₂-Cp)₂HfMe₂; rac/meso-Ph₂Si(3-Me₃Si—CH₂-Cp)₂HfMe₂; rac/meso-PhMeSi(3-Me₃Si—CH₂-Cp)₂HfMe₂; rac/meso-(CH₂)₄Si(3-Me₃Si—CH₂-Cp)₂HfMe₂; rac/meso-(CH₂)₃Si(3-Me₃Si—CH₂-Cp)₂HfMe₂; Me(H)Si(3-Me₃Si—CH₂-Cp)₂HfMe₂; Ph(H)Si(3-Me₃Si—CH₂-Cp)₂HfMe₂; rac/meso-(biphenyl)₂Si(3-Me₃Si—CH₂-Cp)₂HfMe₂; rac/meso-(F—C₆H₄)₂Si(3-Me₃Si—CH₂-Cp)₂HfMe₂; rac/meso-Me₂Ge(3-Me₃Si—CH₂-Cp)₂HfMe₂; rac-Me₂Ge(3-Me₃Si—CH₂-Cp)₂HfMe₂; rac/meso-Ph₂Ge(3-Me₃Si—CH₂-Cp)₂HfMe₂; Me₂Si(Me₄Cp)(3-Me₃Si—CH₂-Cp)HfMe₂; Ph₂Si(Me₄Cp)(3-Me₃Si—CH₂-Cp)HfMe₂; Me₂Ge(Me₄Cp)(3-Me₃Si—CH₂-Cp)HfMe₂; Ph₂Ge(Me₄Cp)(3-Me₃Si—CH₂-Cp)HfMe₂; PhMeSi(Me₄Cp)(3-Me₃Si—CH₂-Cp)HfMe₂; (CH₂)₃Si(Me₄Cp)(3-Me₃Si—CH₂-Cp)HfMe₂; (CH₂)₄Si(Me₄Cp)(3-Me₃Si—CH₂-Cp)HfMe₂; Et₂Si(Me₄Cp)(3-Me₃Si—CH₂-Cp)HfMe₂; or the versions thereof where the Me₂ is replaced with Et₂, Cl₂, Br₂, I₂, or Ph₂.

39. The catalyst system of claim 2, wherein each of the catalysts represented by formula (B) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl) zirconium dichloride, rac/meso-bis(1-methylindenyl) zirconium dimethyl, rac/meso-bis(1-propylindenyl) zirconium dichloride, rac/meso-bis(1-propylindenyl) zirconium dimethyl, rac/meso-bis(1-butylindenyl) zirconium dichloride, rac/meso-bis(1-butylindenyl) zirconium dimethyl, meso-bis(1-ethylindenyl) zirconium dichloride, meso-bis(1-ethylindenyl) zirconium dimethyl, (1-methylindenyl)(pentamethylcyclopentadienyl) zirconium dichloride, and (1-methylindenyl)(pentamethyl cyclopentadienyl) zirconium dimethyl, and dimethylsilyl-bis(indenyl)zirconium dichloride, rac/meso-(Me₂Si)₂O(Ind)₂ZrCl₂; meso-(Me₂Si)₂O(Ind)₂ZrCl₂; rac/meso-(Ph₂Si)₂O(Ind)₂ZrCl₂; rac/meso-(MePhSi)₂O(Ind)₂ZrCl₂; rac/meso-(tBu₂Si—O—SiPh₂)O(Ind)₂ZrCl₂; rac/meso-(Me₂Si)₂O(1-MeInd)₂ZrCl₂; rac/meso-(Ph₂Si)₂O(1-MeInd)₂ZrCl₂; rac/meso-(MePhSi)₂O(1-MeInd)₂ZrCl₂; rac/meso-(tBu₂Si—O—SiPh₂)O(1-MeInd)₂ZrCl₂; rac/meso-(Me₂Si)₂O(1-EtInd)₂ZrCl₂; rac/meso-(Ph₂Si)₂O(1-EtInd)₂ZrCl₂; rac/meso-(MePhSi)₂O(1-EtInd)₂ZrCl₂; rac/meso-(tBu₂Si—O—SiPh₂)O(1-EtInd)₂ZrCl₂; rac/meso-(Me₂Si)₂O(1-PrInd)₂ZrCl₂; rac/meso-(Ph₂Si)₂O(1-PrInd)₂ZrCl₂; rac/meso-(MePhSi)₂O(1-PrInd)₂ZrCl₂; rac/meso-(tBu₂Si—O—SiPh₂)O(1-PrInd)₂ZrCl₂; rac/meso-(Me₂Si)₂(Ind)₂ZrCl₂; rac/meso-(Ph₂Si)₂(Ind)₂ZrCl₂; rac/meso-(MePhSi)₂(Ind)₂ZrCl₂; rac/meso-(tBuPhSi)₂(Ind)₂ZrCl₂; rac/meso-(NpPhSi)₂(Ind)₂ZrCl₂; rac/meso-(Me₂Si)₂(1-MeInd)₂ZrCl₂; rac/meso-(Ph₂Si)₂(1-MeInd)₂ZrCl₂; rac/meso-(MePhSi)₂(1-MeInd)₂ZrCl₂; rac/meso-(tBuPhSi)₂(1-MeInd)₂ZrCl₂; or rac/meso-(NpPhSi)₂(1-MeInd)₂ZrCl₂.

40. The catalyst system of claim 9, wherein each of the catalysts represented by formula (B) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl) zirconium dichloride, rac/meso-bis(1-methylindenyl) zirconium dimethyl, rac/meso-bis(1-propylindenyl) zirconium dichloride, rac/meso-bis(1-propylindenyl) zirconium dimethyl, rac/meso-bis(1-butylindenyl) zirconium dichloride, rac/meso-bis(1-butylindenyl) zirconium dimethyl, meso-bis(1-ethylindenyl) zirconium dichloride, meso-bis(1-ethylindenyl) zirconium dimethyl, (1-methylindenyl)(pentamethylcyclopentadienyl) zirconium dichloride, (1-methylindenyl)(pentamethyl cyclopentadienyl) zirconium dimethyl, dimethylsilyl-bis(indenyl)zirconium dichloride, rac/ meso-(Me$_2$Si)$_2$O(Ind)$_2$ZrCl$_2$; meso-(Me$_2$Si)$_2$O(Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$Si—O—SiPh$_2$)O(Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O(1-PrInd)$_2$ZrCl$_2$; rac/meso-(MePhSi)$_2$O(1-PrInd)$_2$ZrCl$_2$; rac/meso-(tBu$_2$ Si—O—SiPh$_2$)O(1-PrInd)$_2$ZrCl$_2$; rac/meso-(Me$_2$Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$(1-MeInd)$_2$ZrCl$_2$; rac/meso-(tBuPh Si)$_2$(1-MeInd)$_2$ZrCl$_2$; or rac/meso-(NpPhSi)$_2$(1-MeInd)$_2$ZrCl$_2$.

41. The catalyst system of claim 9, wherein each of the catalysts represented by formula (B) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl)zirconium dichloride, meso-bis(1-ethylindenyl) zirconium dimethyl, (1-methylindenyl)(pentamethylcyclopentadienyl) zirconium dichloride, (1-methylindenyl) (pentamethyl cyclopentadienyl) zirconium dimethyl, dimethylsilyl-bis(indenyl)zirconium dichloride, rac/meso-(Me$_2$Si)$_2$O(Ind)$_2$ZrCl$_2$; meso-(Me$_2$Si)$_2$O(Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$Si—O—SiPh$_2$)O(Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$ Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O(1-PrInd)$_2$ZrCl$_2$; rac/meso-(MePhSi)$_2$O(1-PrInd)$_2$ZrCl$_2$; rac/meso-(tBu$_2$ Si—O—SiPh$_2$)O(1-PrInd)$_2$ZrCl$_2$; rac/meso-(Me$_2$ Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$ Si)$_2$(1-MeInd)$_2$ZrCl$_2$; rac/meso-(Ph$_2$ Si)$_2$(1-MeInd)$_2$ZrCl$_2$; rac/meso-(MePhSi)$_2$(1-MeInd)$_2$ZrCl$_2$; rac/meso-(tBuPhSi)$_2$(1-MeInd)$_2$ZrCl$_2$; or rac/meso-(NpPhSi)$_2$(1-MeInd)$_2$ZrCl$_2$; wherein each of the catalysts represented by formula (C) is selected from: bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl) zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl)zirconium dichloride, meso-bis(1-ethylindenyl) zirconium dimethyl, (1-methylindenyl)(pentamethylcyclopentadienyl) zirconium dichloride, (1-methylindenyl) (pentamethyl cyclopentadienyl) zirconium dimethyl, or dimethylsilyl-bis(indenyl)zirconium dichloride;

wherein each of the catalysts represented by formula (D) is selected from:
rac/meso-(Me$_2$Si)$_2$O(Ind)$_2$ZrCl$_2$; meso-(Me$_2$Si)$_2$O(Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$ Si—O—SiPh$_2$)O(Ind)$_2$ZrCl$_2$; rac/meso-(Me$_2$ Si)$_2$O(1-MeInd)$_2$ZrCl$_2$; rac/meso-(Ph$_2$ Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$ Si—O—SiPh$_2$)$_0$ (1-EtInd)$_2$ZrCl$_2$; rac/meso-(Me$_2$ Si)$_2$O(1-PrInd)$_2$ZrCl$_2$; rac/meso-(Ph$_2$ Si)$_2$O (1-PrInd)$_2$ZrCl$_2$; rac/meso-(MePhSi)$_2$O(1-PrInd)$_2$ZrCl$_2$; rac/meso-(tBu$_2$ Si—O—SiPh$_2$)O(1-PrInd)$_2$ZrCl$_2$; rac/meso-(Me$_2$ Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$ (1-MeInd)$_2$ZrCl$_2$; rac/meso-(tBuPhSi)$_2$(1-MeInd)$_2$ZrCl$_2$; or rac/meso-(NpPhSi)$_2$(1-MeInd)$_2$ZrCl$_2$.

42. The catalyst system of claim 9, wherein each of the catalysts represented by formula (B) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl)zirconium dichloride, meso-bis(1-ethylindenyl) zirconium dimethyl, (1-methylindenyl)(pentamethyl cyclopentadienyl) zirconium dichloride, (1-methylindenyl)(pentamethyl cyclopentadienyl) zirconium dimethyl, dimethylsilyl-bis(indenyl)zirconium dichloride, rac/meso-(Me$_2$Si)$_2$O(Ind)$_2$ZrCl$_2$; meso-(Me$_2$Si)$_2$O(Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$Si—O—SiPh$_2$)O(Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O(1-PrInd)$_2$ZrCl$_2$; rac/meso-(MePhSi)$_2$O(1-PrInd)$_2$ZrCl$_2$; rac/meso-(tBu$_2$Si—O—SiPh$_2$)O(1-PrInd)$_2$ZrCl$_2$; rac/meso-(Me$_2$Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$(1-MeInd)$_2$ZrCl$_2$; rac/meso-(tBuPhSi)$_2$(1-MeInd)$_2$ZrCl$_2$; or rac/meso-(NpPhSi)$_2$(1-MeInd)$_2$ZrCl$_2$;

wherein each of the catalysts represented by formula (C) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl)zirconium dichloride, meso-bis(1-ethylindenyl) zirconium dimethyl, (1-methyl indenyl)(pentamethylcyclopentadienyl) zirconium dichloride, (1-methylindenyl)(pentamethyl cyclopentadienyl) zirconium dimethyl, or dimethylsilyl-bis(indenyl)zirconium dichloride.

43. The catalyst system of claim 9, wherein each of the catalysts represented by formula (C) is selected from:
bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium di chloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-bis(1-ethylindenyl)zirconium dichloride, rac/meso-bis(1-ethylindenyl)zirconium dimethyl, rac/meso-bis(1-methylindenyl)zirconium dichloride, rac/meso-bis(1-methylindenyl)zirconium dimethyl, rac/meso-bis(1-propylindenyl)zirconium dichloride, rac/meso-bis(1-propylindenyl)zirconium dimethyl, rac/meso-bis(1-butylindenyl)zirconium dichloride, rac/meso-bis(1-butylindenyl)zirconium dimethyl, meso-bis(1-ethylindenyl)zirconium dichloride, meso-bis(1-ethylindenyl) zirconium dimethyl, (1-methyl indenyl)(pentamethylcyclopentadienyl) zirconium dichloride, (1-methylindenyl)(pentamethyl cyclopentadienyl) zirconium dimethyl, or dimethylsilyl-bis(indenyl)zirconium dichloride;

wherein each of the catalysts represented by formula (D) is selected from:

rac/meso-(Me$_2$Si)$_2$O(Ind)$_2$ZrCl$_2$; meso-(Me$_2$Si)$_2$O(Ind)$_2$ZrCl$_2$; rac/meso-(Ph$_2$Si)$_2$O(Ind)$_2$ZrCl$_2$; rac/meso-(MePhSi)$_2$O(Ind)$_2$ZrCl$_2$; rac/meso-(tBu$_2$Si—O—SiPh$_2$)O(Ind)$_2$ZrCl$_2$; rac/meso-(Me$_2$Si)$_2$O(1-MeInd)$_2$ZrCl$_2$; rac/meso-(Ph$_2$Si)$_2$O(1-MeInd)$_2$ZrCl$_2$; rac/meso-(MePhSi)$_2$O(1-MeInd)$_2$ZrCl$_2$; rac/meso-(tBu$_2$Si—O—SiPh$_2$)O(1-MeInd)$_2$ZrCl$_2$; rac/meso-(Me$_2$Si)$_2$O(1-EtInd)$_2$ZrCl$_2$; rac/meso-(Ph$_2$Si)$_2$O(1-EtInd)$_2$ZrCl$_2$; rac/meso-(MePhSi)$_2$O(1-EtInd)$_2$ZrCl$_2$; rac/meso-(tBu$_2$Si—O—SiPh$_2$)O(1-EtInd)$_2$ZrCl$_2$; rac/meso-(Me$_2$Si)$_2$O(1-PrInd)$_2$ZrCl$_2$; rac/meso-(Ph$_2$Si)$_2$O(1-PrInd)$_2$ZrCl$_2$; rac/meso-(MePhSi)$_2$O(1-PrInd)$_2$ZrCl$_2$; rac/meso-(tBu$_2$Si—O—SiPh$_2$)O(1-PrInd)$_2$ZrCl$_2$; rac/meso-(Me$_2$Si)$_2$(Ind)$_2$ZrCl$_2$; rac/meso-(Ph$_2$Si)$_2$(Ind)$_2$ZrCl$_2$; rac/meso-(MePhSi)$_2$(Ind)$_2$ZrCl$_2$; rac/meso-(tBuPhSi)$_2$(Ind)$_2$ZrCl$_2$; rac/meso-(NpPhSi)$_2$(Ind)$_2$ZrCl$_2$; rac/meso-(Me$_2$Si)$_2$(1-MeInd)$_2$ZrCl$_2$; rac/meso-(Ph$_2$Si)$_2$(1-MeInd)$_2$ZrCl$_2$; rac/meso-(MePhSi)$_2$(1-MeInd)$_2$ZrCl$_2$; rac/meso-(tBuPhSi)$_2$(1-MeInd)$_2$ZrCl$_2$; or rac/meso-(NpPhSi)$_2$(1-MeInd)$_2$ZrCl$_2$.

44. The catalyst system of claim 2, wherein the support material has a surface area from 10 m$^2$/g to 700 m$^2$/g and an average particle diameter from 10 μm to 500 μm.

45. The catalyst system of claim 2, wherein the support material is selected from the group consisting of silica, alumina, silica-alumina, and combinations thereof.

46. The catalyst system of claim 2, wherein the support material is fluorided or sulfated.

47. The catalyst system of claim 2, wherein the support material has a fluorine concentration from 0.6 wt % to 3.5 wt %, based upon the weight of the support material.

48. The catalyst system of claim 2, wherein the activator comprises alumoxane or a noncoordinating anion.

49. The catalyst system of claim 2, wherein the support is a silica aluminate comprising an electron withdrawing anion, selected from fluoride or sulphate.

50. A process for polymerization of olefin monomers comprising contacting one or more olefin monomers with the catalyst system of claim 2.

51. A process for the production of an ethylene alpha-olefin copolymer comprising: polymerizing ethylene and at least one alpha-olefin by contacting the ethylene and at least one alpha-olefin with the catalyst system of claim 2 in at least one slurry phase reactor at a reactor pressure of from 0.7 to 70 bar and a reactor temperature of from 60° C. to 130° C. to form an ethylene alpha-olefin copolymer.

52. A process for the production of an ethylene alpha-olefin copolymer comprising: polymerizing ethylene and at least one alpha-olefin by contacting the ethylene and at least one alpha-olefin with the catalyst system of claim 1 wherein the ethylene alpha-olefin copolymer comprises ethylene derived units and from 0.5 to 20 wt % of C$_3$ to C$_{12}$ α-olefin derived units; and has:

an MI from 0.1 to 20 g/10 min;
a density from 0.890 to 0.940 g/cc;
a melt index ratio, I$_{21}$/I$_2$, from 25 to 45 g/10 min;
a Tw$_1$-Tw$_2$ value less than −30° C.;
an Mw$_1$/Mw$_2$ value of from 0.9 to 4;
an Mw/Mn between 5 and 10;
an Mz/Mw between 2.5 and 3.5;
an Mz/Mn between 15 and 25; and
a g'(vis) greater than 0.90,
wherein the copolymer is formed into a film.

53. A process for the production of an ethylene alpha-olefin copolymer comprising: polymerizing ethylene and at least one alpha-olefin by contacting the ethylene and at least one alpha-olefin with the catalyst system of claim 1 in at least one gas-phase reactor, where the copolymer has a density of 0.890 g/cc or more, a melt flow index from 0.1 to 80 g/10 min, and a Mw/Mn from 2.5 to 12.5, where in the copolymer is formed into a film.

54. The catalyst system of claim 1, wherein R$^8$ and R$^9$ are independently CH$_2$—SiR'$_3$ or —CH$_2$—CR'$_3$.

55. The catalyst system of claim 1, wherein R$^9$ is —CH$_2$—SiR'3 or —CH$_2$—CR'3.

56. The catalyst system of claim 2, wherein M$^1$ and M$^2$ are both zirconium and T$^3$ is Si(Me)$_2$OSi(Me)$_2$-, —Si(Me)$_2$Si(Me)$_2$-, or —CH$_2$CH$_2$—.

57. The catalyst system of claim 2, wherein R$^8$ and R$^9$ are independently CH$_2$—SiR'$_3$ or —CH$_2$—CR'$_3$.

58. The catalyst system of claim 2, wherein R$^9$ is —CH$_2$—SiR'$_3$ or —CH$_2$—CR'$_3$.

59. The catalyst system of claim 1, wherein the support is a silica aluminate comprising an electron withdrawing anion selected from fluoride or sulphate.

* * * * *